United States Patent
Ikenuma et al.

(10) Patent No.: US 12,218,337 B2
(45) Date of Patent: Feb. 4, 2025

(54) POWER STORAGE DEVICE ELECTRODE, METHOD FOR MANUFACTURING THE SAME, POWER STORAGE DEVICE, AND ELECTRONIC DEVICE

(71) Applicant: SEMICONDUCTOR ENERGY LABORATORY CO., LTD., Atsugi (JP)

(72) Inventors: Tatsuya Ikenuma, Kanagawa (JP); Kazutaka Kuriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 231 days.

(21) Appl. No.: 17/350,248

(22) Filed: Jun. 17, 2021

(65) Prior Publication Data

US 2021/0313555 A1  Oct. 7, 2021

Related U.S. Application Data

(62) Division of application No. 14/517,994, filed on Oct. 20, 2014, now abandoned.

(30) Foreign Application Priority Data

Oct. 22, 2013  (JP) .................................. 2013-219537

(51) Int. Cl.
    *H01M 4/13*    (2010.01)
    *H01M 4/04*    (2006.01)
    (Continued)

(52) U.S. Cl.
    CPC ........... *H01M 4/13* (2013.01); *H01M 4/0404* (2013.01); *H01M 4/139* (2013.01); *H01M 4/366* (2013.01);
    (Continued)

(58) Field of Classification Search
    None
    See application file for complete search history.

(56) References Cited

U.S. PATENT DOCUMENTS 6,218,050 B1  4/2001  Yoon et al.
9,231,273 B2  1/2016  Lee et al.
(Continued)

FOREIGN PATENT DOCUMENTS

EP  2800171 A  11/2014
JP  11-096993 A  4/1999
(Continued)

OTHER PUBLICATIONS

Machine translation of JP 2012183823 A, 2012.*
(Continued)

*Primary Examiner* — Jonathan G Leong
*Assistant Examiner* — Tony S Chuo
(74) *Attorney, Agent, or Firm* — NIXON PEABODY LLP; Jeffrey L. Costellia

(57) ABSTRACT

To provide a highly reliable power storage device. To provide a long-life power storage device. To provide a power storage device electrode having high adhesion with a current collector. To reduce or inhibit electrochemical decomposition of an electrolytic solution or the like on a surface of an electrode. The power storage device electrode includes a current collector and a second electrode layer provided over the current collector and including a second binder and an active material. A first electrode layer including a first binder and conductive particles is provided between the current collector and the second electrode layer. At least part of a surface of the active material is provided with a coating film, and the coating film is porous.

18 Claims, 22 Drawing Sheets

(51) Int. Cl.
  *H01M 4/139* (2010.01)
  *H01M 4/36* (2006.01)
  *H01M 4/62* (2006.01)
  *H01M 10/42* (2006.01)
  *H01M 10/052* (2010.01)

(52) U.S. Cl.
  CPC ........... *H01M 4/622* (2013.01); *H01M 4/625* (2013.01); *H01M 10/4235* (2013.01); *H01M 10/052* (2013.01)

(56) References Cited

U.S. PATENT DOCUMENTS

| | | |
|---|---|---|
| 2003/0036000 A1 | 2/2003 | Mori et al. |
| 2003/0108795 A1 | 6/2003 | Tamura et al. |
| 2004/0234850 A1 | 11/2004 | Watarai et al. |
| 2008/0160420 A1 | 7/2008 | Adachi et al. |
| 2009/0301866 A1 | 12/2009 | Zaghib et al. |
| 2011/0177396 A1 | 7/2011 | Moriwaka et al. |
| 2011/0291240 A1 | 12/2011 | Yamazaki |
| 2012/0141866 A1 | 6/2012 | Kuriki et al. |
| 2013/0052528 A1 | 2/2013 | Kuriki et al. |
| 2013/0164619 A1 | 6/2013 | Yamakaji et al. |
| 2013/0266858 A1 | 10/2013 | Inoue et al. |
| 2013/0323585 A1 | 12/2013 | Inoue et al. |
| 2014/0057165 A1 | 2/2014 | Yamakaji et al. |
| 2014/0087251 A1* | 3/2014 | Takahashi ............... H01M 4/62 429/211 |
| 2014/0099554 A1 | 4/2014 | Inoue et al. |
| 2014/0127566 A1 | 5/2014 | Kuriki et al. |
| 2014/0127567 A1 | 5/2014 | Kuriki et al. |
| 2014/0127568 A1 | 5/2014 | Kawakami et al. |

FOREIGN PATENT DOCUMENTS

| | | | |
|---|---|---|---|
| JP | 11-273680 A | 10/1999 | |
| JP | 2004-014381 A | 1/2004 | |
| JP | 2005-302510 A | 10/2005 | |
| JP | 2005-332769 A | 12/2005 | |
| JP | 2009-200007 A | 9/2009 | |
| JP | 2010-097817 A | 4/2010 | |
| JP | 2010-244847 A | 10/2010 | |
| JP | 2012183823 A * | 9/2012 | ............. Y02E 10/50 |
| JP | 2013-069672 A | 4/2013 | |
| WO | WO-2011/013756 | 2/2011 | |
| WO | WO-2013/100651 | 7/2013 | |

OTHER PUBLICATIONS

Ogumi.Z et al., "6.1.6 Influence of Electrolytic Solution and Surface Film Formation", Lithium secondary battery, Mar. 20, 2008, pp. 116-124, Ohmsha.

* cited by examiner

FIG. 8A
FIG. 8B
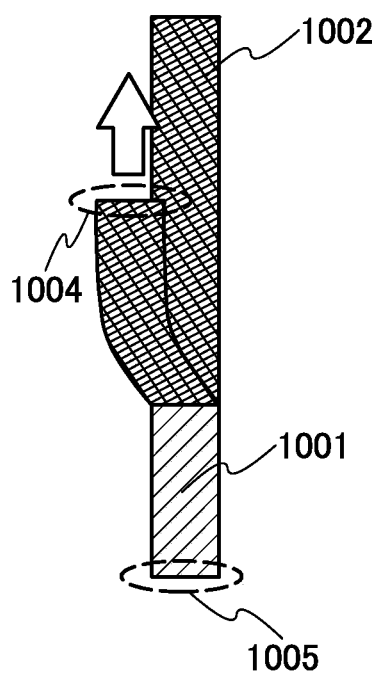
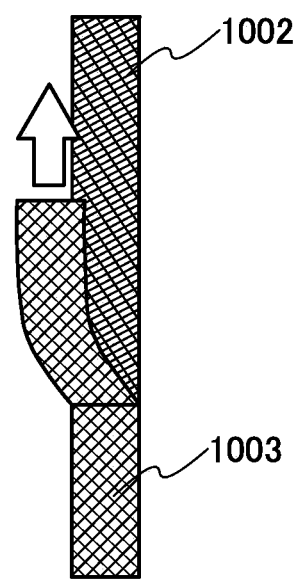

FIG. 16A1
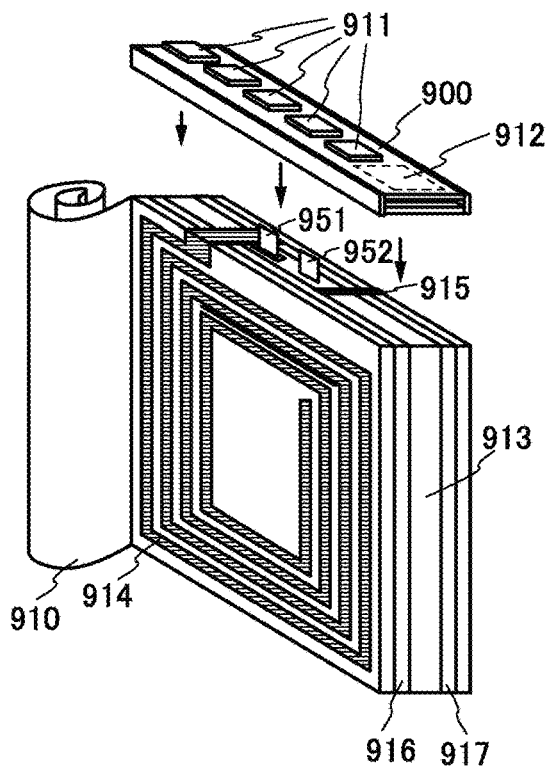
FIG. 16A2
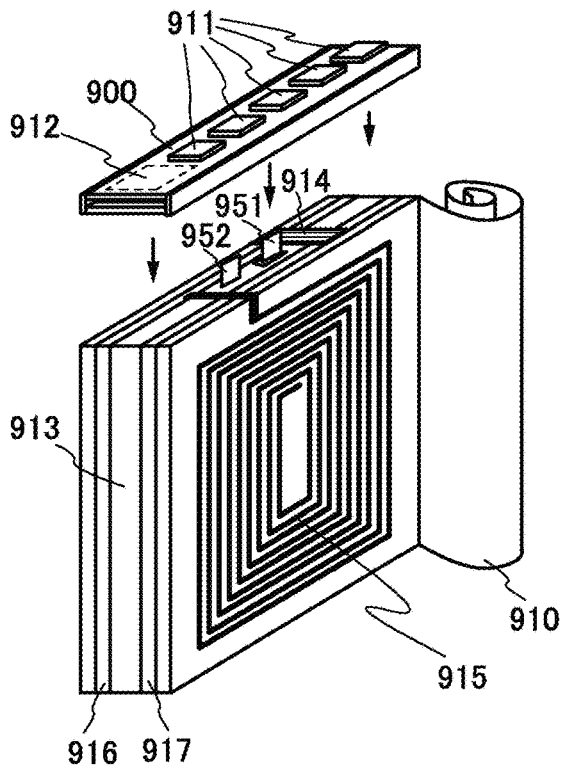
FIG. 16B1
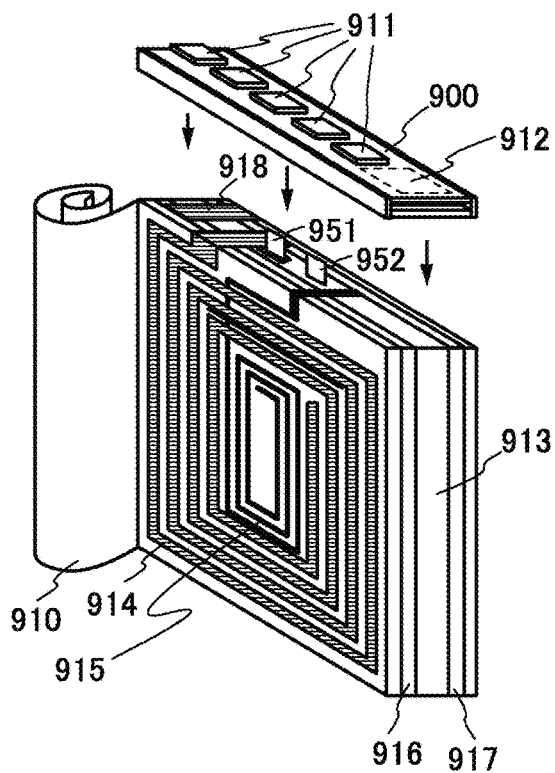
FIG. 16B2
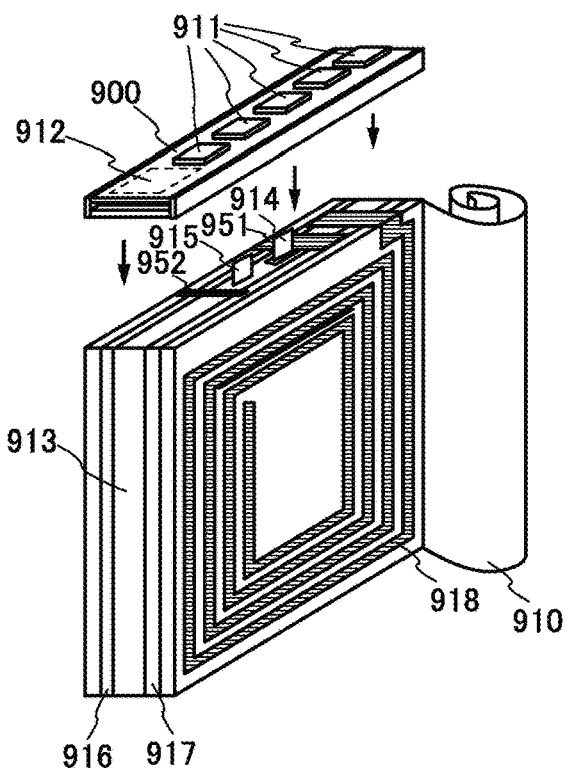

POWER STORAGE DEVICE ELECTRODE, METHOD FOR MANUFACTURING THE SAME, POWER STORAGE DEVICE, AND ELECTRONIC DEVICE

BACKGROUND OF THE INVENTION

1. Field of the Invention

The present invention relates to an object, a method, or a manufacturing method. In addition, the present invention relates to a process, a machine, manufacture, or a composition of matter. One embodiment of the present invention relates to a semiconductor device, a display device, a light-emitting device, a power storage device, a driving method thereof, and a manufacturing method thereof. In particular, one embodiment of the present invention relates to a power storage device electrode and a method for manufacturing the power storage device electrode.

2. Description of the Related Art

In recent years, various power storage devices such as secondary batteries including lithium-ion secondary batteries and the like, lithium ion capacitors, and air cells have been actively developed. In particular, demand for lithium-ion secondary batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

At present, a negative electrode containing a graphite-based carbon material is commonly used as a negative electrode for a lithium-ion secondary battery and is formed, for example, in the following manner: graphite as a negative electrode active material, acetylene black (AB) as a conductive additive, and polyvinylidene fluoride (PVdF) which is a resin as a binder are mixed to form slurry, the slurry is applied to a current collector, and the slurry is dried.

The battery reaction of such a negative electrode for a lithium-ion secondary battery or a lithium-ion capacitor occurs at an extremely low potential and the negative electrode has a high reducing ability. For this reason, an electrolytic solution using an organic solvent is reductively decomposed. The range of potentials in which the electrolysis of an electrolytic solution does not occur is referred to as a potential window. The reaction potential of the negative electrode is preferably within the potential window of the electrolytic solution. However, reaction potentials of the negative electrodes of a lithium-ion secondary battery and a lithium-ion capacitor are out of the potential windows of almost all electrolytic solutions. Actually, a decomposition product of the electrolysis of the electrolytic solution forms a surface film on the surface of the negative electrode, and the surface film inhibits further reductive decomposition. Consequently, lithium ions can be inserted into the negative electrode with the use of a low reaction potential below the potential window of the electrolytic solution (e.g., Non-Patent Document 1).

However, at the same time as battery reaction, the electrolytic solution is gradually decomposed and a surface film is formed due to the decomposition product, and thus, deterioration gradually proceeds. Therefore, it cannot be said that such a surface film is sufficiently stable. When such an unstable film is used, the decomposition reaction of the electrolytic solution speeds up at high temperature and hinders operation of a battery in high temperature environments; thus, a more stable film is demanded. In addition, the formation of the surface film causes irreversible capacity, resulting in a partial loss of charge and discharge capacity. Further, the surface film has extremely small electric conductivity, which lowers the electric conductivity of an electrode while a battery is charged and discharged. For this reason, electrode potential distribution is inhomogeneous. Consequently, the charge and discharge capacity of the battery is low, and the cycle life of the battery is short due to local charge and discharge.

For these reasons, there is demand for an artificial coating film which is different from the surface film, that is, an artificial coating film on the surface of the negative electrode which is more stable and can be formed without losing capacity.

On the other hand, at present, a lithium-containing complex phosphate or the like is used as an active material in a positive electrode for a lithium-ion secondary battery. The decomposition reaction between such a material and an electrolytic solution occurs at high temperature and high voltage; accordingly, a surface film is formed due to the decomposition product. Therefore, as in the negative electrode, irreversible capacity is caused in the positive electrode, resulting in a decrease in charge and discharge capacity.

Here, Patent Document 1 discloses that, to prevent deterioration of charge and discharge cycle characteristics and life properties caused by an active material dropping off from a current collector, perhydropolysilazane is used in combination with a binder which is a fluorine macromolecule, and an electrode mix using the perhydropolysilazane, the binder, and a positive electrode material is applied to a current collector and then heated to form an electrode coated with a complex film of the perhydropolysilazane and the binder.

REFERENCE

Patent Document

[Patent Document 1] Japanese Published Patent Application No. H11-273680

Non-Patent Document

[Non-Patent Document 1] Zempachi Ogumi, "Lithium Secondary Battery", Ohmsha, Ltd., the first impression of the first edition published on March, 20, H20, pp. 116-118

SUMMARY OF THE INVENTION

An object of one embodiment of the present invention is to provide a highly reliable power storage device. An object of one embodiment of the present invention is to provide a long-life power storage device.

An object of one embodiment of the present invention is to provide a power storage device electrode having high adhesion between a current collector and an electrode layer. An object of one embodiment of the present invention is to provide a power storage device electrode in which deterioration due to deformation is inhibited. An object of one embodiment of the present invention is to provide a power storage device electrode in which deterioration due to repeated charging and discharging of a power storage device is inhibited.

An object of one embodiment of the present invention is to reduce irreversible capacity which causes a decrease in the charge and discharge capacity and to reduce or inhibit the electrochemical decomposition of an electrolytic solution and the like on a surface of an electrode. An object of one embodiment of the present invention is to reduce or inhibit the decomposition reaction of an electrolytic solution and the like occurring as a side reaction in repeated charging and discharging of a power storage device in order to improve the cycle characteristics of the power storage device. An object of one embodiment of the present invention is to reduce or inhibit the decomposition reaction of an electrolytic solution, which speeds up at high temperature, and to prevent a decrease in charge and discharge capacity in charging and discharging at high temperature, in order to extend the operating temperature range of a power storage device.

An object of one embodiment of the present invention is to provide a novel electrode. An object of one embodiment of the present invention is to provide a novel power storage device. One embodiment of the present invention can achieve at least one of the objects set forth above.

Further, one embodiment of the present invention provides a method for forming a power storage device electrode which achieves at least one of the above objects. One embodiment of the present invention provides a power storage device electrode which achieves at least one of the above objects. One embodiment of the present invention provides a power storage device which achieves at least one of the above objects. Note that the descriptions of these objects do not disturb the existence of other objects. Note that one embodiment of the present invention does not necessarily achieve all the objects listed above. Other objects will be apparent from and can be derived from the description of the specification, the drawings, the claims, and the like.

One embodiment of the present invention is a power storage device electrode including a current collector and a second electrode layer over the current collector. The second electrode layer includes a second binder and an active material. A first binder is provided between the current collector and the second electrode layer. At least part of a surface of the active material is provided with a coating film. The coating film is porous.

One embodiment of the present invention is a power storage device electrode including a current collector, a second electrode layer over the current collector, and a first electrode layer between the current collector and the second electrode layer. The second electrode layer includes a second binder and an active material. The first electrode layer includes a first binder and a conductive particle. At least part of a surface of the active material is provided with a coating film. The coating film is porous.

In the above structure, the conductive particle preferably includes carbon as a material. Furthermore, in the above structure, it is preferable that the coating film include silicon (Si) and oxygen (O) as main components, and the coating film include carbon (C) and fluorine (F).

In the above structure, the first binder preferably includes at least one of a carboxyl group, a carbonyl group, and a hydroxy group.

In the above structure, the second binder preferably includes at least one of a carboxyl group, a carbonyl group, and a hydroxy group.

One embodiment of the present invention is a power storage device including the above power storage device electrode.

One embodiment of the present invention is an electronic device including the above power storage device.

One embodiment of the present invention is a method for manufacturing a power storage device electrode including the following steps (1) to (6). (1) A first mixture including a first binder and a conductive particle is formed. (2) The first mixture is formed over at least one surface of a current collector. (3) A second mixture including a second binder and an active material is formed. The second binder includes at least one of a carboxyl group, a carbonyl group, and a hydroxy group. (4) Polysilazane is added to the second mixture to form a third mixture. (5) The third mixture is formed over the at least one surface of the current collector. (6) The third mixture is baked by heat treatment and the polysilazane is hydrolyzed to form a coating film covering at least part of a surface of the active material. At least one of the carboxyl group, the carbonyl group, and the hydroxy group generates a gas by reacting with the polysilazane between the step (4) and the step (6).

Note that in this specification and the like, a positive electrode and a negative electrode may be collectively referred to as an electrode or the electrode may refer to at least one of the positive electrode and the negative electrode.

One embodiment of the present invention makes it possible to provide a power storage device with high reliability. One embodiment of the present invention makes it possible to provide a power storage device with a long lifetime.

One embodiment of the present invention makes it possible to provide a power storage device electrode having high adhesion between a current collector and an electrode layer. One embodiment of the present invention makes it possible to provide a power storage device electrode in which deterioration due to deformation is inhibited. One embodiment of the present invention makes it possible to provide a power storage device electrode in which deterioration due to repeated charging and discharging of a power storage device is inhibited.

One embodiment of the present invention makes it possible to reduce irreversible capacity which causes a decrease in the charge and discharge capacity and to reduce or inhibit the electrochemical decomposition of an electrolytic solution and the like on a surface of an electrode. One embodiment of the present invention makes it possible to reduce or inhibit the decomposition reaction of an electrolytic solution and the like occurring as a side reaction in repeated charging and discharging of a power storage device in order to improve the cycle characteristics of the power storage device. One embodiment of the present invention makes it possible to reduce or inhibit the decomposition reaction of an electrolytic solution, which speeds up at high temperature, and to prevent a decrease in charge and discharge capacity in charging and discharging at high temperature, in order to extend the operating temperature range of a power storage device. One embodiment of the present invention makes it possible to provide a novel electrode. One embodiment of the present invention makes it possible to provide a novel power storage device. Note that the description of these effects does not disturb the existence of other effects. One embodiment of the present invention does not necessarily achieve all the above effects. Other effects will be apparent from and can be derived from the description of the specification, the drawings, the claims, and the like.

BRIEF DESCRIPTION OF THE DRAWINGS

FIGS. 8A and 8B illustrate a method of a peel strength test.

FIGS. 16A1, 16A2, 16B1, and 16B2 illustrate examples of power storage devices.

DETAILED DESCRIPTION OF THE INVENTION

Figure 1A:
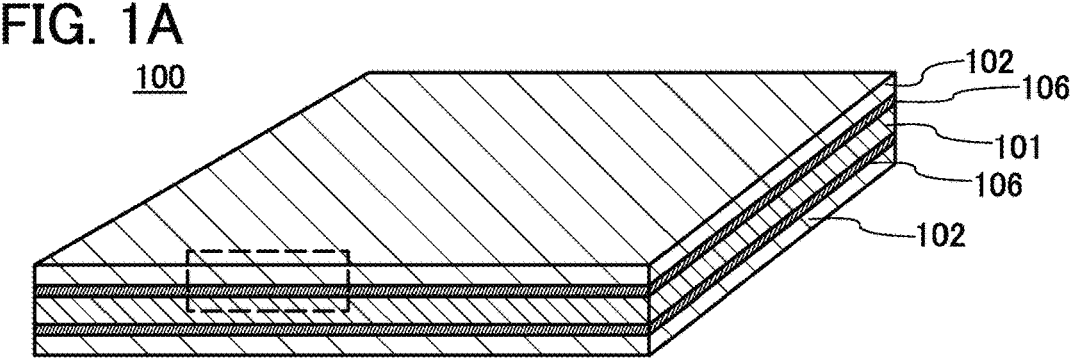
FIGS. 1A to 1D illustrate a power storage device electrode.

Embodiments of the present invention are described below in detail with reference to the drawings. However, the present invention is not limited to the descriptions of the embodiments and it is easily understood by those skilled in the art that the mode and details can be changed variously. Therefore, the present invention should not be construed as being limited to the description in the following embodiments.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second", "third", or the like as appropriate. In addition, the ordinal numbers in this specification and the like are not necessarily the same as the ordinal numbers used to specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Note that in the present specification and the like, a charging rate and a discharging rate are current values at the time of charging and discharging a power storage device such as a secondary battery. For example, in the case where a power storage device with a capacitance of X [Ah] is charged at a constant current, a charging rate of 1 C means a current of I [A] with which charging is completed in just one hour. A charging rate of 0.2 C means a current of I/5 [A], that is, a current with which charging is completed in five hours. Similarly, a discharging rate of 1 C means a current of I [A] with which discharging is completed in just one hour. A discharging rate of 0.2 C means a current of I/5 [A].

Embodiment 1

In this embodiment, a layer for increasing adhesion is provided between a current collector and an active material layer. In addition, a coating film is formed on an active material with the use of perhydropolysilazane.

With the use of perhydropolysilazane, a coating film can be formed on a surface of an active material in a power storage device electrode. Such a coating film can inhibit reaction between the active material and an electrolytic solution and reduce irreversible capacity.

When a coating film is formed on a surface of an active material of a power storage device electrode with the use of perhydropolysilazane and a binder having a carboxyl group (—COOH) is used, a porous coating film can be formed as a result of interaction between the carboxyl group and perhydropolysilazane. An electrode including this porous coating film has better cycle characteristics.

"The coating film is porous" means that the coating film has a number of pores on its surface or inside. Further, the shape of the film can also be regarded as a net-like skeleton formed of an irregular arrangement of thin stripe active materials.

Interaction between the binder having a carboxyl group and perhydropolysilazane was suggested by the results of Fourier-transform infrared spectroscopy (FT-IR) analysis. FT-IR analysis was performed on a polyvinylidene fluoride (PVdF) film (Sample 1) obtained by applying a binder (PVdF) dispersed in an N-methyl-2-pyrrolidone (NMP) solvent to a substrate and then drying, and a PVdF and silicon oxide film (Sample 2) obtained by applying PVdF dispersed in an NMP solvent to which perhydropolysilazane was added to a substrate and then drying. Sample 1 showed a peak around a wavenumber of 1750 cm$^{-1}$, but Sample 2 showed a peak with lower intensity and a peak shift was observed. A peak around a wavenumber of 1750 cm$^{-1}$ is ascribed to C=O stretching vibration of a carboxylic acid. Consequently, there are probably some interactions between PVdF and perhydropolysilazane. That is, a carboxylic acid probably contributes to a reaction where perhydropolysilazane is changed into silicon oxide.

Here, perhydropolysilazane undergoes a reaction shown by Formula 1 below, so that silicon oxide is formed.

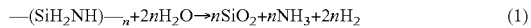

$$—(SiH_2NH)—_n + 2nH_2O \rightarrow nSiO_2 + nNH_3 + 2nH_2 \quad (1)$$

It is assumed that during a process represented by Reaction Formula 1, perhydropolysilazane becomes an intermediate to which a hydroxy group (—OH) is added, for example. The intermediate to which a hydroxy group is added is then condensed, so that silicon oxide is formed. In the process of forming an intermediate, a carboxyl group contained in PVdF reacts with perhydropolysilazane to generate ammonium ($NH_3$) and hydrogen ($H_2$). This reaction probably starts in a step for forming slurry at room temperature in which PVdF and perhydropolysilazane are mixed. For this reason, a coating film formed as a result is a porous or spongy film having a number of pores due to an evolved gas such as ammonium.

Figure 9:
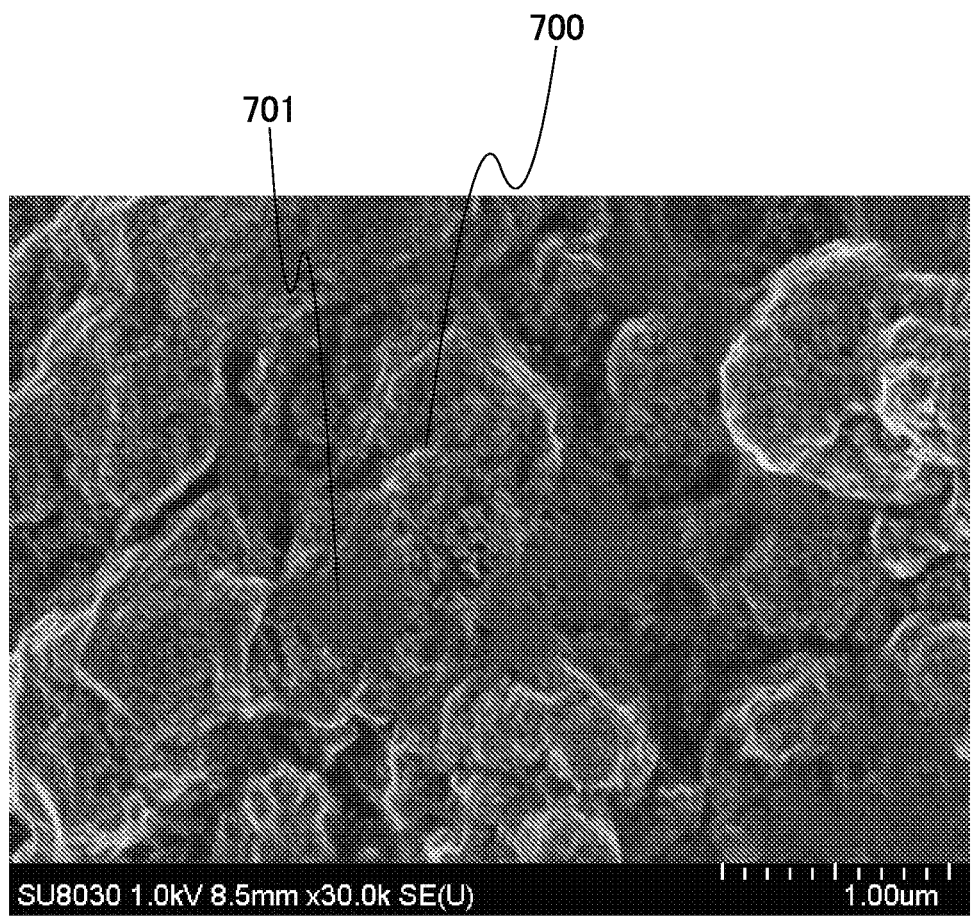
FIG. 9 is a SEM image of an active material layer.

FIG. 9 shows an observation image of an electrode including an active material layer containing an active material whose surface is partly covered with such a porous coating film, which is obtained with a scanning electron microscope (SEM). FIG. 9 shows an observation result of the surface of the active material layer in the power storage device electrode of one embodiment of the present invention obtained with the SEM. The active material layer uses the binder containing the carboxyl group. The active material here is graphite. The binder here is polyvinylidene fluoride (PVdF) having a carboxyl group.

The magnification at which a plurality of graphite particles 700 in the active material layer can be observed as shown in FIG. 9 is 30000-fold. The graphite particles 700 are each covered with a coating film 701. The coating film 701 extends to one of the plurality of graphite particles 700 to the other thereof to connect the plurality of graphite particles 700.

When a cross-sectional shape of one of the graphite particles and a region around the graphite particle was observed with a transmission electron microscope (TEM), a coating film formed on a surface of the graphite particle was observed. The coating film has a thickness in the range of approximately 60 nm to 200 nm. Furthermore, when the components of the coating film were examined by energy dispersive X-ray spectroscopy (EDX (also referred to as EDS)) in the TEM, silicon (Si) and oxygen (O) were detected clearly around the graphite particle and carbon (C) and fluorine (F) were also detected.

The above indicates that the coating film 701 covering the surface of the graphite particle 700 is silicon oxide containing carbon (C) and fluorine (F).

Here, a functional group of the compound reacting with perhydropolysilazane is not limited to a carboxyl group and may be a hydroxy group, for example. The compound reacting with perhydropolysilazane may have a carboxyl group or a hydroxy group as a result of reaction, and may be, for example, a compound having a carbonyl group such as an ester or a carboxylic acid amide. An ester and an amide (e.g., a carboxylic acid amide) can form a carboxyl group by decomposition reaction, for example, hydrolysis.

Next, results of observation of a bent electrode are described. A porous coating film is formed by using perhydropolysilazane and a binder having a carboxyl group. It was shown that an electrode including an active material layer containing an active material whose surface is partly covered with the above-described coating film less suffers breaking of the active material layer at the time of bending the electrode than an electrode including an active material layer which is formed using PVdF as a binder but not using perhydropolysilazane. Thus, it can be said that in the former electrode, adhesion between active material particles is high and the strength of the active material layer is also high. Since breaking of the active material layer can be inhibited, the active material layer is probably flexible. An electrode X is an electrode in which an active material layer includes an active material whose surface is partly covered with a porous coating film formed by the use of perhydropolysilazane and a binder having a carboxyl group. An electrode Y is an electrode including an active material layer which is formed using PVdF as a binder but not using perhydropolysilazane.

A method for forming slurry X that is a material for the active material layer of the electrode X is described. Graphite particles with an average primary grain diameter of 10 μm are added to N-methyl-2-pyrrolidone (NMP) including 12 wt % polyvinylidene fluoride (PVdF), and the mixture is stirred and mixed in a mixer at 2000 rpm to give a mixture A. Here, the average grain diameter means an equivalent spherical diameter i.e., the diameter of a sphere with the same volume as the particle, for example. The PVdF is one to which a carboxyl group is added. Then, a perhydropolysilazane solution is dropped into the mixture A, and the mixture is stirred and mixed in a mixer at 2000 rpm, whereby the slurry X for application of the active material layer is obtained. The slurry X includes graphite, PVdF, and silicon oxide in a weight ratio of 88:9.8:2.2 (wt %). The slurry X is preferably formed in a dry room to prevent entry of moisture.

After that, the slurry X is applied to a copper current collector with the use of a blade coating apparatus. The current collector to which the slurry X is applied is dried by ventilation drying at 70° C. to volatilize a polar solvent. Then, to form the coating film on the active material, heating is performed at high humidity in a draft chamber. The heating can be performed at approximately 150° C. Through this step, the electrode is baked, hydrolysis of the perhydropolysilazane proceeds, which forms an intermediate, and finally, silicon oxide is formed. Then, heating is performed at 170° C. in a reduced pressure atmosphere. The heating time is longer than or equal to 4 hours and shorter than or equal to 20 hours. Pressing is then performed, so that the electrode X is formed.

Next, slurry Y that is a material for the active material layer of the electrode Y is formed. The graphite particles with an average primary grain diameter of 10 μm are added to N-methyl-2-pyrrolidone (NMP) including 8 wt % polyvinylidene fluoride (PVdF), and the mixture is stirred and mixed in a mixer, so that the slurry Y is obtained. The slurry Y includes graphite and PVdF in a weight ratio of 90:10 (wt %). The PVdF is one to which a carboxyl group is added. Then, the slurry Y is applied to a copper current collector and dried, whereby the electrode Y is obtained.

CR2032 coin-type storage batteries (with a diameter of 20 mm and a height of 3.2 mm) that include the electrode X and the electrode Y are manufactured. After charging and discharging, the cells are disassembled, and the electrodes are taken out. Then, the electrodes are bent and observed.

Specifically, first, the coin-type storage batteries were manufactured. As a counter electrode, a lithium (Li) metal foil was used. An electrolytic solution was formed in such a manner that lithium hexafluorophosphate ($LiPF_6$) was dissolved at a concentration of 1 mol/L in a solution in which ethylene carbonate (EC) and ethyl methyl carbonate (EMC) were mixed at a volume ratio of 1:1.

Next, charging and discharging of the manufactured storage batteries were performed 10 times. The environmental temperature was 60° C. The discharging (lithium (Li) insertion) of the half cells was performed in the following manner: constant current discharging was performed to a lower limit of 0.01 V, and then, constant voltage discharging was performed at a voltage of 0.01 V to a lower limit of a current value corresponding to 0.01 C. The first constant current discharging was performed at a rate of 0.1 C, and the second to tenth constant current discharging was performed at a rate of 0.2 C. As the charging (lithium (Li) extraction), constant current charging was performed to an upper limit of 1 V. The first charging was performed at a rate of 0.1 C, and the second to tenth charging was performed at a rate of 0.2 C. The electrodes were taken out after the charging and discharging and washed with dimethyl carbonate (DMC). After that, the electrodes were bent and observed.

Figure 4A:
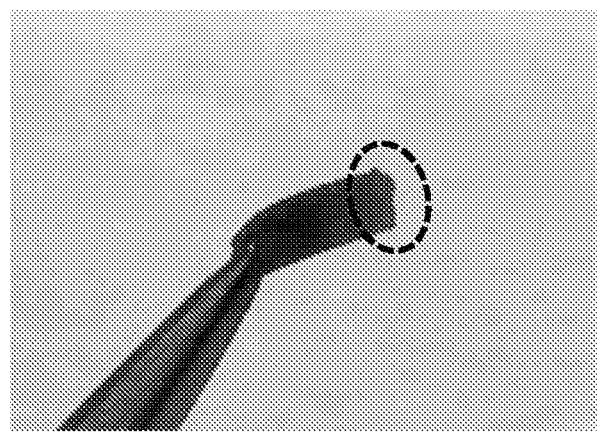
FIGS. 4A and 4B are photographs of power storage device electrodes.
Figure 4B:
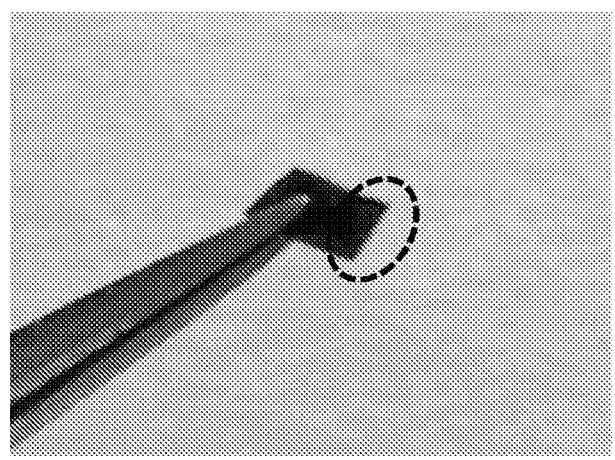

FIGS. 4A and 4B respectively show photographs of the electrode X and the electrode Y after bending. The electrode Y, which was formed using PVdF as a binder but not using perhydropolysilazane, was broken by bending. In contrast, the electrode X, in which the active material layer includes an active material whose surface is partly covered with a porous coating film formed using perhydropolysilazane and a binder having a carboxyl group, suffered less breakage than the electrode Y and was found to be flexible.

Because the active material layer is flexible, the degree of deterioration can be low even when the electrode is repeatedly bent. Therefore, this electrode can be used for a flexible substrate, a flexible housing, a flexible display device, a flexible electronic device, and the like. This electrode can also be used for a flexible power storage device. Since the degree of deterioration is low even when the electrode is repeatedly bent, a power storage device with a longer lifetime can be provided.

However, because of reaction between perhydropolysilazane and the binder that is included in the slurry which becomes the active material layer, adhesion between the active material particles in the active material layer becomes higher than adhesion between the active material layer and the current collector; thus, the electrode including the active material layer using the active material whose surface is partly covered with the porous coating film sometimes has low adhesion with a current collector interface. In that case, external force, e.g., force for separating the electrode from the current collector, might cause peeling of the active material layer because of low adhesion at the interface between the active material and the current collector.

In some cases, a power storage device is provided in a flexible portion of a flexible display device, a flexible electronic device, or the like (a portion or the whole of a housing). When the power storage device, together with the flexible portion, is repeatedly changed in shape, e.g., is repeatedly bent, peeling might occur between the current collector and the active material in the power storage device electrode and deterioration of the power storage device might be promoted.

Therefore, it is preferable that the active material layer be a second electrode layer and a first electrode layer for increasing adhesion between the second electrode layer and the current collector be provided between the second electrode layer and the current collector. The first electrode layer and the second electrode layer are collectively referred to as an electrode layer. The electrode layer is provided over the current collector and includes the first electrode layer and the second electrode layer. An electrode layer of the positive electrode is referred to as a positive electrode layer. An electrode layer of the negative electrode is referred to as a negative electrode layer.

The first electrode layer includes a first binder. The first electrode layer preferably includes conductive particles for providing conductive paths between the current collector and the active material layer or between the active material particles. To increase the energy density of the power storage device, the first electrode layer is preferably thin. The thickness of the first electrode layer is preferably 10 µm or less, further preferably 5 µm or less, still further preferably 1 µm or less. The shape of the first electrode layer is not limited to a film shape and may be an island-like shape, for example.

After formation of the first electrode layer, the second electrode layer is formed. The second electrode layer is formed by application of slurry to the current collector and the first electrode layer. The slurry for forming the second electrode layer preferably includes a material that reacts with the first binder in the first electrode layer.

At the time of formation of the second electrode layer, part of the first electrode layer may be dissolved in the slurry for forming the second electrode layer to form unevenness on the surface of the first electrode layer. When partly dissolved and solidified again, part of the first electrode layer is mixed with the second electrode layer, which can increase adhesion. In addition, when the surface of the first electrode layer has unevenness, the surface area in which the second electrode layer and the first electrode layer are in contact with each other increases, which can increase adhesion.

The slurry for forming the second electrode layer includes an active material, perhydropolysilazane, a second binder, and a solvent. An amine or the like may be included as a catalyst. Further, a conductive additive may also be included. When the slurry for forming the second electrode layer includes a material that reacts with the first binder in the first electrode layer, adhesion between the first electrode layer and the second electrode layer can be increased at the time of formation of the second electrode layer. For example, the adhesion can be increased when the first binder in the first electrode layer and perhydropolysilazane react with each other to form a bond.

Alternatively, the first electrode layer and the amine as the catalyst may react with each other. When the first binder in the first electrode layer and the amine react with each other, the first binder is changed in quality to easily react with perhydropolysilazane in some cases. By reaction with the amine, the first electrode layer might be partly dissolved and have unevenness.

Figure 1B:
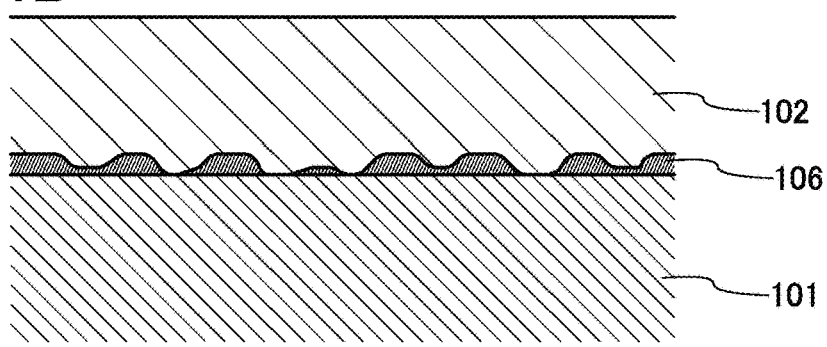

FIGS. 1A to 1D illustrate a power storage device electrode 100 of one embodiment of the present invention. FIG. 1A is a perspective view of the power storage device electrode 100. In the power storage device electrode 100, a first electrode layer 106 and a second electrode layer 102 are formed on both surfaces of a current collector 101 (although not illustrated, the first electrode layer 106 and the second electrode layer 102 may be formed on one of the surfaces of the current collector 101). FIG. 1B is a cross-sectional view of a part surrounded by a dashed line in FIG. 1A.

The current collector 101 can be formed using a material having high conductivity such as a metal typified by stainless steel, gold, platinum, zinc, iron, copper, aluminum, or titanium, or an alloy thereof. Alternatively, the current collector 101 can be formed using an aluminum alloy to which an element which improves heat resistance, such as silicon, neodymium, scandium, or molybdenum, is added.

Further alternatively, the current collector 101 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The current collector 101 can have a foil-like shape, a plate-like shape (sheet-like shape), a net-like shape, a punching-metal shape, an expanded-metal shape, or the like as appropriate.

The shape of the first electrode layer 106 is not limited to a film shape and may be an island-like shape, for example. The first electrode layer 106 includes the first binder and conductive particles. As the first binder of the first electrode layer 106, for example, any of the following resin materials can be used: polyvinylidene fluoride (PVdF), polyarylamine, polyvinyl alcohol (PVA), carboxymethyl cellulose, polyethylene oxide (PEO), polypropylene oxide, sodium polyacrylate, a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, a polyimide, polyvinyl chloride, isobutylene, polyethylene terephthalate, nylon, and polyacrylonitrile (PAN).

The first binder preferably has at least one of a carboxyl group, a carbonyl group, and a hydroxy group as a functional group and binds any of the active material, the conductive additive, and the current collector.

As the conductive particles included in the first electrode layer 106, a carbon material, for example, natural graphite, artificial graphite such as meso-carbon microbeads, mesophase pitch-based carbon fibers, isotropic pitch-based carbon fibers, carbon nanotubes, acetylene black (AB), or graphene can be used. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. For this reason, the use of graphene as the conductive additive can increase the points and the area where the electrode active material particles are in contact with each other.

Note that graphene in this specification includes single-layer graphene and multilayer graphene including 2 or more and 100 or less layers. Single-layer graphene refers to a one-atom-thick sheet of carbon molecules having $\pi$ bonds. Graphene oxide refers to a compound formed by oxidation of such graphene. When graphene oxide is reduced to graphene, oxygen contained in the graphene oxide is not entirely released and part of the oxygen remains in the graphene. In the case where graphene contains oxygen, the proportion of oxygen measured by X-ray photoelectron spectroscopy (XPS) is 2 at % or more and 20 at % or less, preferably 3 at % or more and 15 at % or less of all the detected elements.

Figure 1C:
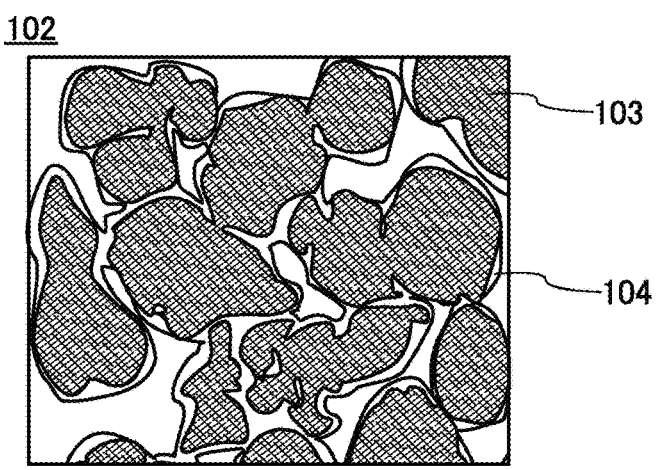

After the first electrode layer 106 is provided, the second electrode layer 102 is provided over one or both surfaces of the current collector 101 with the first electrode layer 106 provided therebetween. FIG. 1C schematically illustrates a cross section of the second electrode layer 102 in the thickness direction. The second electrode layer 102 includes an active material 103, a coating film 104 covering at least part of a surface of the active material, and a second binder.

A material which enables a charge-discharge reaction by insertion and extraction of carrier ions is used as the active material of the power storage device electrode that is one embodiment of the present invention, and in particular, such a material having a particle shape is used.

Here, "particle" is used to indicate the exterior shape of an active material having a given surface area, such as a spherical shape, a powder shape, a plate shape, a horn shape, a columnar shape, a needle shape, or a flake shape. Active material particles are not necessarily in spherical shapes and the particles may have given shapes different from each other. A method for forming the active material particles is not limited as long as the active material particles have any of the above-described shapes.

There is no particular limitation on the average diameter of the active material particles; active material particles with a general average diameter or diameter distribution are used. As the active material, active material particles having an average diameter within the range of 1 μm to 50 μm can be used, for example. When each of the active material particles is a secondary particle, the average diameter of primary particles included in the secondary particle can be within the range of 10 nm to 1 μm.

Further, there is no particular limitation on the shape of the active material; even when a film of the active material or a stack of a plurality of films of the active material is used, by forming the coating film of one embodiment of the present invention thereover, an effect similar to that in the case of the active material particles can be obtained.

When the active material 103 is a negative electrode active material, graphite that is a carbon material generally used in the field of power storage can be used. Examples of graphite include low crystalline carbon, such as soft carbon and hard carbon, and high crystalline carbon, such as natural graphite, kish graphite, pyrolytic carbon, mesophase pitch based carbon fiber, meso-carbon microbeads (MCMB), mesophase pitches, petroleum coke, and coal-based coke.

As the negative electrode active material, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, and In can be used as the alloy-based material. Such metals have higher capacity than graphite. In particular, silicon has a significantly high theoretical capacity of 4200 mAh/g. For this reason, silicon is preferably used as the negative electrode active material.

When the active material 103 is a positive electrode active material, a material into and from which carrier ions can be inserted and extracted is used. For example, a compound such as $LiFeO_2$, $LiCoO_2$, $LiNiO_2$, $LiMn_2O_4$, $V_2O_5$, $Cr_2O_5$, or $MnO_2$ can be used.

Alternatively, a lithium-containing complex phosphate ($LiMPO_4$ (general formula) (M is one or more of Fe(II), Mn(II), Co(II), and Ni(II))) can be used for the positive electrode active material. Typical examples of the general formula $LiMPO_4$ are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Further alternatively, a lithium-containing complex silicate such as $Li_2MSiO_4$ (general formula) (M is one or more of Fe(II), Mn(II), Co(II), and Ni(II)) can be used. Typical examples of the general formula $Li_2MSiO_4$ are $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

Examples of carrier ions used for a power storage device are lithium ions, which are a typical example thereof; alkali-metal ions other than lithium ions; and alkaline-earth metal ions. In the case where such ions other than lithium ions are used as carrier ions, the following may be used as the positive electrode active material: a compound which is obtained by substituting an alkali metal (e.g., sodium or potassium) or an alkaline-earth metal (e.g., calcium, strontium, barium, beryllium, or magnesium) for lithium in any of the above lithium compounds, the lithium-containing complex phosphate, and the lithium-containing complex silicate.

In FIG. 1C, a plurality of active material particles are illustrated as the active material 103. There is no particular limitation on the average diameter of the active material particles; active material particles with a general average diameter or diameter distribution are used. As the active material 103, active material particles having an average diameter within the range of 1 μm to 50 μm can be used, for example. When each of the active material particles is a secondary particle, the average diameter of primary particles included in the secondary particle can be within the range of 10 nm to 1 μm.

The coating film 104 does not completely electrically insulate the active material particles; some of the active material particles are in contact with each other to form aggregates. Surfaces of the aggregates are covered with the coating film 104. In FIG. 1C, although being covered with the coating film 104, the aggregates are connected in the depth direction; thus, the active material particles are three-dimensionally in contact with one another to form a conductive path.

The coating film 104 does not necessarily cover the whole surface of the active material particle or the aggregate, and covers at least part of the surface. When the active material particles are completely electrically insulated, free movement of electrons inside and outside the active material particles is regulated, which makes it difficult for a battery reaction to occur. In some cases, a partly exposed surface of the active material particle is in contact with another active material particle to ensure electric conductivity.

Carrier ions can pass through the coating film 104. The coating film needs to be formed using a material through which carrier ions can pass, and to be thin enough to allow carrier ions to pass through the coating film. The coating film 104 may have a thickness of greater than or equal to 10 nm and less than or equal to 10 μm, for example.

In the case of using an active material whose volume is changed in charging and discharging as the active material 103, the shape of the coating film 104 is preferably changed following a change in shape of the active material 103 due to the change in volume. Therefore, the Young's modulus of the coating film is preferably less than or equal to 70 GPa.

Figure 1D:
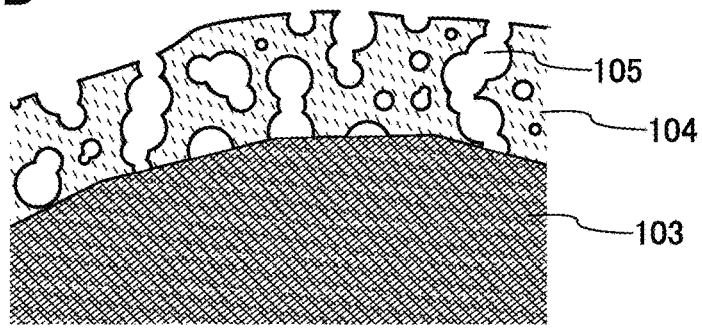

FIG. 1D is a schematic view of an enlarged cross section of part of the coating film 104 on the active material 103. The coating film 104 is a porous film having a number of pores 105 on its surface or inside. In other words, the coating film 104 is spongy. The pores 105 are formed in given positions such as a position on the surface of the coating film 104 and a position inside the coating film 104. The pores 105 are bonded to extend from the surface of the coating film 104 to the surface of the active material 103 in some cases. The pores 105 extend in the depth direction in FIG. 1D. Thus, the coating film 104 includes a portion where the pores 105 are connected to each other to spread in a net-like shape. In other words, the coating film 104 has a hollow structure in which thin stripe portions other than the pores 105 form a net-like skeleton.

There is no particular limitation on the diameter of the pores 105. The diameter is preferably smaller than the thickness of the coating film 104. For example, the pores 105 can each have a diameter of greater than or equal to 1 nm and less than or equal to 1 μm. In the coating film 104, the density of the pores 105 is preferably high, that is, it is preferable that the coating film 104 have a large number of pores and be entirely hollow.

Such a porous shape of the coating film 104 is probably formed as an outflow pathway of a gas of ammonium or the like generated when the coating film is formed.

Carrier ions can pass through the coating film 104. The coating film needs to be formed using a material through which carrier ions can pass, and to be thin enough to allow carrier ions to pass through the coating film.

As a material for the coating film, silicon oxide that is an insulator is used. In particular, in one embodiment of the present invention, silicon oxide contains at least carbon (C) and fluorine (F) in addition to silicon (Si) and oxygen (O). The coating film is denser than a conventional surface film that is formed on a surface of an active material because of a decomposition product of an electrolytic solution.

Thus, having carrier ion conductivity, the coating film 104 covering the active material 103 can transmit carrier ions, and a battery reaction of the active material 103 can occur. On the other hand, having an insulating property, the coating film 104 can inhibit the reaction between an electrolytic solution and the active material 103.

The coating film of one embodiment of the present invention is artificially provided before a power storage device is charged and discharged, and is clearly distinguished from a surface film formed because of the decomposition reaction between an electrolytic solution and an active material in this specification and the like. Thus, in this specification and the like, the coating film is described as distinguished from the surface film.

Furthermore, to increase the conductivity of the second electrode layer 102, a conductive additive may be included in the second electrode layer 102 in addition to the active material 103 and the second binder.

As the second binder, for example, any of the following resin materials can be used: polyvinylidene fluoride (PVdF), polyarylamine, polyvinyl alcohol (PVA), carboxymethyl cellulose, polyethylene oxide (PEO), polypropylene oxide, sodium polyacrylate, a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, a polyimide, polyvinyl chloride, isobutylene, polyethylene terephthalate, nylon, and polyacrylonitrile (PAN).

The second binder preferably has at least one of a carboxyl group, a carbonyl group, and a hydroxy group as a functional group and binds any of the active material, the conductive additive, and the current collector.

As the conductive additive, a material with a large specific surface area is desirably used; for example, acetylene black (AB) is preferably used. Alternatively, a carbon material such as a carbon nanotube, graphene, or fullerene can be used.

Figure 2:
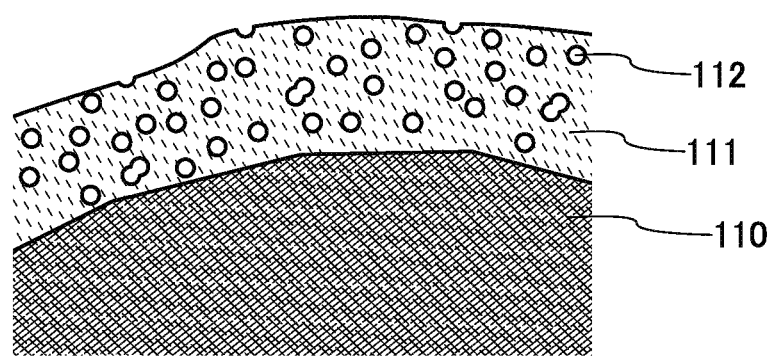
FIG. 2 illustrates a power storage device electrode.

FIG. 2 is a schematic view of a cross section of a coating film 111 which is provided on an active material 110 and is different from that in FIG. 1D. Almost all of a plurality of pores 112 are not in contact with each other, which is different from the coating film 104 in FIG. 1D. Thus, there are hardly any pores each formed by a number of the pores 112 connected to each other and extending from the surface of the active material 110 to the surface of the coating film 111. For this reason, an electrolytic solution is not in contact with the active material 110 in a region where the coating film 111 is provided. This makes it possible to inhibit the generation of a surface film between the electrolytic solution and the active material.

As described above, by forming a coating film covering part of an active material on a surface of the active material, a battery reaction of the active material can occur and a decomposition reaction of an electrolytic solution can be inhibited.

Figure 3:
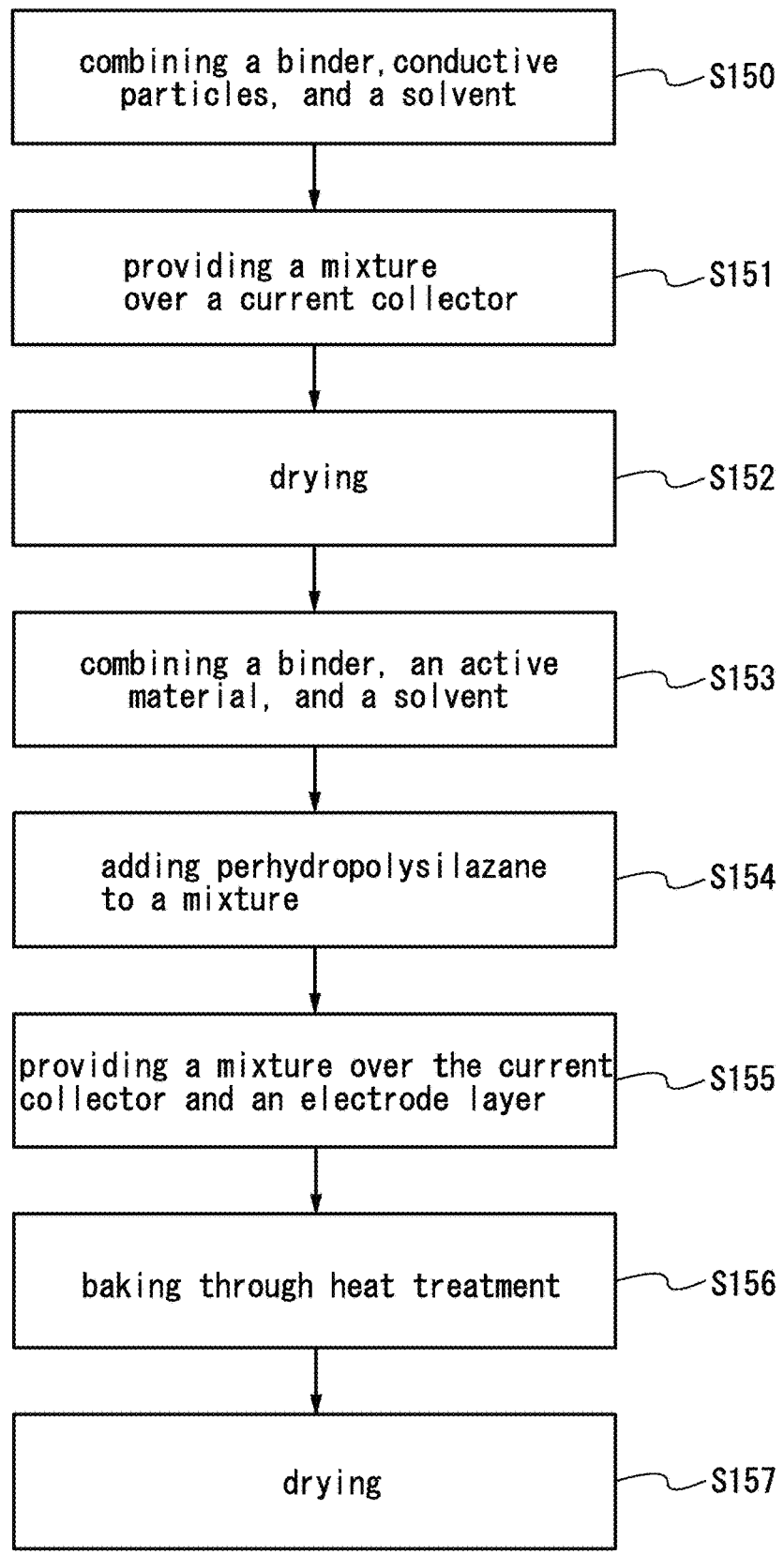
FIG. 3 illustrates a method for forming a power storage device electrode.

Next, an example of a method for forming a power storage device electrode is described with reference to FIG. 3.

First, the first binder, the conductive particles, and a solvent are combined and stirred to form a first mixture (Step S150).

For the first binder, for example, any of the following resin materials can be used: polyvinylidene fluoride (PVdF), polyarylamine, polyvinyl alcohol (PVA), carboxymethyl cellulose, polyethylene oxide (PEO), polypropylene oxide, sodium polyacrylate, a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, a polyimide, polyvinyl chloride, isobutylene, polyethylene terephthalate, nylon, and polyacrylonitrile (PAN).

Furthermore, the first binder preferably has at least one of a carboxyl group, a carbonyl group, and a hydroxy group that easily react with perhydropolysilazane.

At least one of the carboxyl group, carbonyl group, and hydroxy group is contained in the first binder at greater than or equal to 0.2 wt % and less than 10 wt %.

The obtained first mixture is then provided over the current collector (Step S151).

After that, drying is performed (Step S152). Thus, the first electrode layer can be formed.

Then, the second binder, the active material, and a solvent are combined and stirred to form a second mixture (Step S153).

The second binder at least binds any of the active material, a conductive additive, and a current collector. Examples of the binder are resin materials such as polyvinylidene fluoride (PVdF), a vinylidene fluoride-hex afluoropropylene copolymer, a vinylidene fluoride-tetrafluoroethylene copolymer, styrene-butadiene copolymer rubber, polytetrafluoroethylene, polypropylene, polyethylene, and polyimide.

Furthermore, the second binder preferably has at least one of a carboxyl group, a carbonyl group, and a hydroxy group as a functional group. At least one of the carboxyl group, carbonyl group, and hydroxy group is contained in the second binder at greater than or equal to 0.2 wt % and less than 10 wt %.

Next, a perhydropolysilazane solution is added to the obtained second mixture to form a third mixture (Step S154).

At this time, the reaction between perhydropolysilazane and the functional group contained in the second binder is probably started.

The obtained third mixture is provided over the current collector and the first electrode layer (Step S155).

Steps S153 to S155 are performed in a low humidity environment such as a dry room. This inhibits perhydropolysilazane from being hydrolyzed before the mixture is provided over the current collector. The dew point of the low humidity environment is lower than or equal to −20° C., preferably lower than or equal to −40° C. Note that formation of the mixture at low humidity makes it possible to inhibit reaction between moisture in the atmosphere and perhydropolysilazane. At the same time, it is preferable that when the second binder has a functional group that reacts with perhydropolysilazane, the functional group and perhydropolysilazane can react with each other even at low humidity. By this reaction, a porous and excellent coating film can be formed. The first binder may react with perhydropolysilazane. By this reaction, adhesion between the first electrode layer and the second electrode layer can be increased.

Although not illustrated, after Step S155, the third mixture provided over the current collector may be dried in a low humidity environment such as a dry room. As the drying, ventilation drying may be performed. Heat treatment for the drying is preferably performed at a temperature higher than or equal to 50° C. and lower than or equal to 200° C., further preferably higher than or equal to 60° C. and lower than or equal to 150° C.

Then, the third mixture is baked through heat treatment. The perhydropolysilazane is hydrolyzed at the same time as the baking (Step S156). The current collector and the second mixture provided thereover are carried out of the dry room and Step S156 is performed in the air. With the use of moisture in the air, the hydrolysis of the perhydropolysilazane proceeds. It is probable that as a result of hydrolysis of the perhydropolysilazane, an intermediate is formed, and finally silicon oxide is formed by a condensation reaction. The intermediate has, for example, a silanol group. Dehydration condensation of silanol probably occurs, so that silicon oxide is formed. At this time, the first binder preferably has a functional group that is dehydrated and condensed with the intermediate of the perhydropolysilazane. By this dehydration condensation, adhesion between the first electrode layer and the second electrode layer can be increased. The intermediate of the perhydropolysilazane may react with the second binder by this dehydration condensation. The heat treatment in Step S156 is preferably performed at a temperature higher than or equal to 50° C. and lower than or equal to 200° C., further preferably higher than or equal to 100° C. and lower than or equal to 180° C. For example, the heat treatment can be performed with a hot plate at 150° C. In this manner, the second electrode layer is formed.

The structure of perhydropolysilazane is changed into that of silicon oxide through Step S156. A gas of ammonium or the like generated in this step is released outside, so that a coating film to be formed has a porous shape. Furthermore, adhesion between the first electrode layer and the second electrode layer can be increased.

Then, in Step S157, drying is performed in a reduced pressure atmosphere, whereby a power storage device electrode including an active material covered with a coating film can be obtained. The drying is performed at a temperature higher than or equal to 50° C. and lower than or equal to 200° C., preferably higher than or equal to 140° C. and lower than or equal to 180° C. For example, vacuum drying may be performed at 170° C.

Although description of a step of rolling with a roller press machine or the like is omitted in Steps S150 to S157, the step of rolling may be performed as appropriate to increase the density of an electrode layer.

Through the above steps, a power storage device electrode including an active material covered with a porous coating film can be formed. In the case of forming a coating film on an active material with the use of perhydropolysilazane and a binder containing at least one of a carboxyl group, a carbonyl group, and a hydroxy group in such a manner, the coating film can be formed without a complicated process; therefore, the method for forming the power storage device electrode of one embodiment of the present invention is suitable for a mass production process.

This embodiment can be implemented in combination with any of the other embodiments as appropriate.

Embodiment 2

In this embodiment, the structures of power storage devices including the electrode described in Embodiment 1 will be described with reference to FIGS. 11A to 11C, FIGS. 12A and 12B, FIGS. 13A and 13B, and FIGS. 14A to 14E. Structural examples of power storage devices (storage batteries) will be described with reference to FIGS. 15A and 15B, FIGS. 16A1, 16A2, 16B1, and 16B2, FIGS. 17A and 17B, FIGS. 18A and 18B, and FIG. 19. Examples of electronic devices will be described with reference to FIGS. 20A and 20B.

(Coin-Type Storage Battery)

Figure 11A:
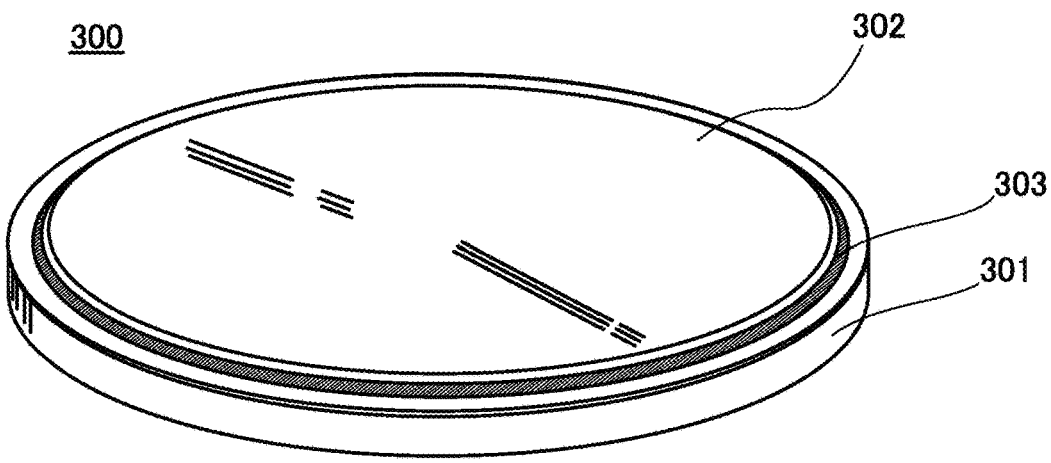
FIGS. 11A to 11C illustrate a coin-type storage battery.
Figure 11B:
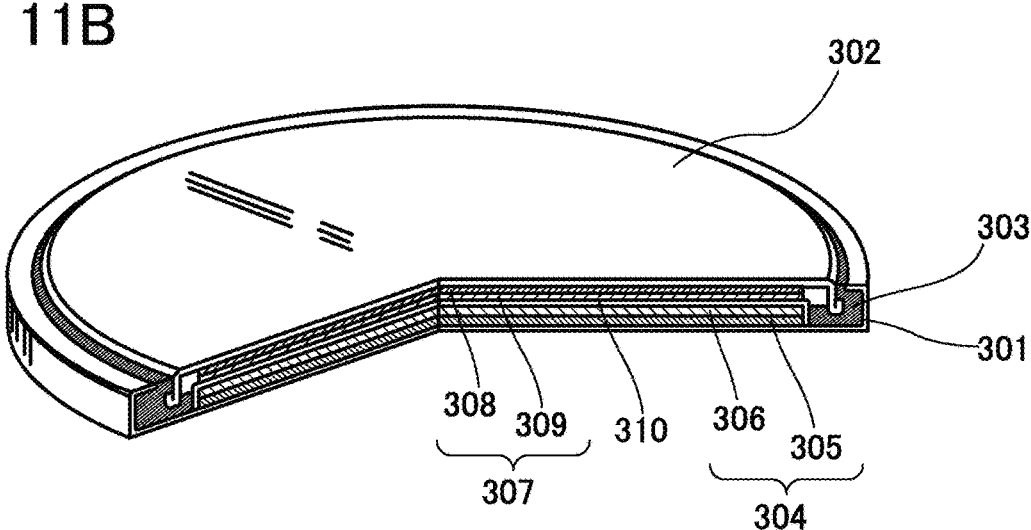

FIG. 11A is an external view of a coin-type (single-layer flat type) storage battery, and FIG. 11B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. Here, as at least one of a positive electrode 304 and a negative electrode 307, the power storage device electrode of one embodiment of the present invention is used.

The positive electrode 304 includes a positive electrode current collector 305 and a positive electrode layer 306 provided in contact with the positive electrode current collector 305. The positive electrode layer 306 may further include a binder for increasing adhesion of positive electrode active material particles, a conductive additive for increasing the conductivity of the positive electrode layer, and the like in addition to the positive electrode active material. As the conductive additive, a material that has a large specific surface area is preferably used; for example, acetylene black (AB) can be used. Alternatively, a carbon material such as a carbon nanotube, graphene, or fullerene can be used. It is preferable that the power storage device electrode described in Embodiment 1 be used as the positive electrode 304. That is, the positive electrode layer 306 preferably includes the second electrode layer containing the active material and the first electrode layer for increasing adhesion, and the active material preferably has a coating film formed using perhydropolysilazane.

The negative electrode 307 includes a negative electrode current collector 308 and a negative electrode layer 309 provided in contact with the negative electrode current collector 308. The negative electrode layer 309 may further include a binder for increasing adhesion of negative electrode active material particles, a conductive additive for increasing the conductivity of the negative electrode layer, and the like in addition to the negative electrode active material. It is preferable that the power storage device electrode described in Embodiment 1 be used as the negative electrode 307. That is, the negative electrode layer 309 preferably includes the second electrode layer containing the active material and the first electrode layer for increasing adhesion, and the active material preferably has a coating film formed using perhydropolysilazane.

A separator 310 and an electrolyte (not illustrated) are provided between the positive electrode layer 306 and the negative electrode layer 309.

As the separator 310, an insulator such as cellulose (paper), polyethylene with pores, and polypropylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium and potassium), an alkaline-earth metal (e.g., calcium, strontium, barium, beryllium, and magnesium) may be used for the supporting electrolyte.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like.

Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid includes a cation and an anion, specifically, an organic cation and an anion. Examples of the organic cation used for the electrolytic solution are aliphatic onium cations, such as a quaternary ammonium cation, a tertiary sulfonium cation, and a quaternary phosphonium cation, and aromatic cations, such as an imidazolium cation and a pyridinium cation. Examples of the anion used for the electrolytic solution are a monovalent amide anion, a monovalent methide anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a power storage device will be described with reference to FIG. 11C. When a secondary battery using lithium ions is regarded as a closed circuit, lithium ions transfer and a current flows in the same direction. Note that in the secondary battery using lithium ions, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 11C:
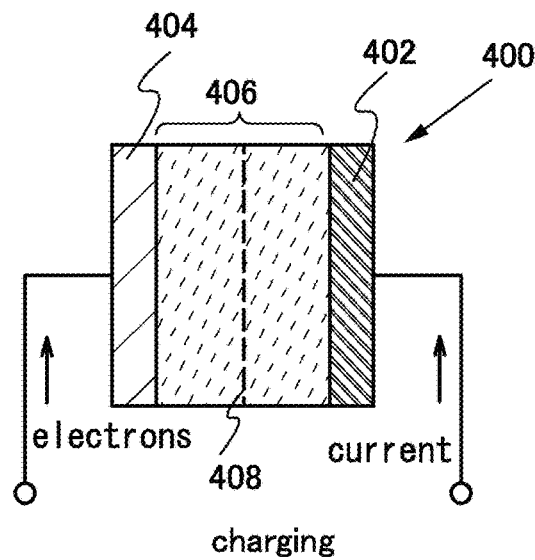

Two terminals in FIG. 11C are connected to a charger, and a storage battery 400 is charged. The storage battery 400 includes a separator 408 and an electrolytic solution 406 between a positive electrode 402 and a negative electrode 404. As the charge of the storage battery 400 proceeds, a potential difference between electrodes increases. The positive direction in FIG. 11C is the direction in which a current flows from one terminal outside the storage battery 400 to the positive electrode 402, flows from the positive electrode 402 to the negative electrode 404 in the storage battery 400, and flows from the negative electrode 404 to the other terminal outside the storage battery 400. In other words, a current flows in the direction of a flow of a charging current.

[Cylindrical Storage Battery]

Figure 12A:
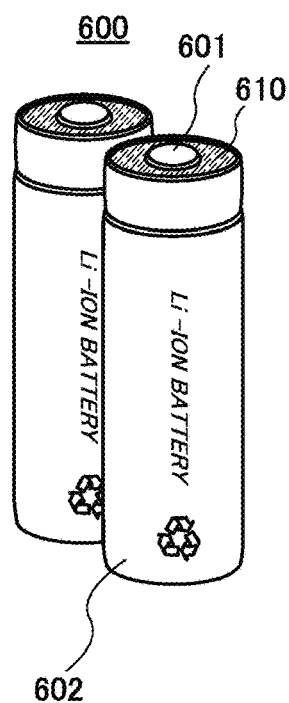
FIGS. 12A and 12B illustrate a cylindrical storage battery.

Next, an example of a cylindrical storage battery will be described with reference to FIGS. 12A and 12B. As illustrated in FIG. 12A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 12B:
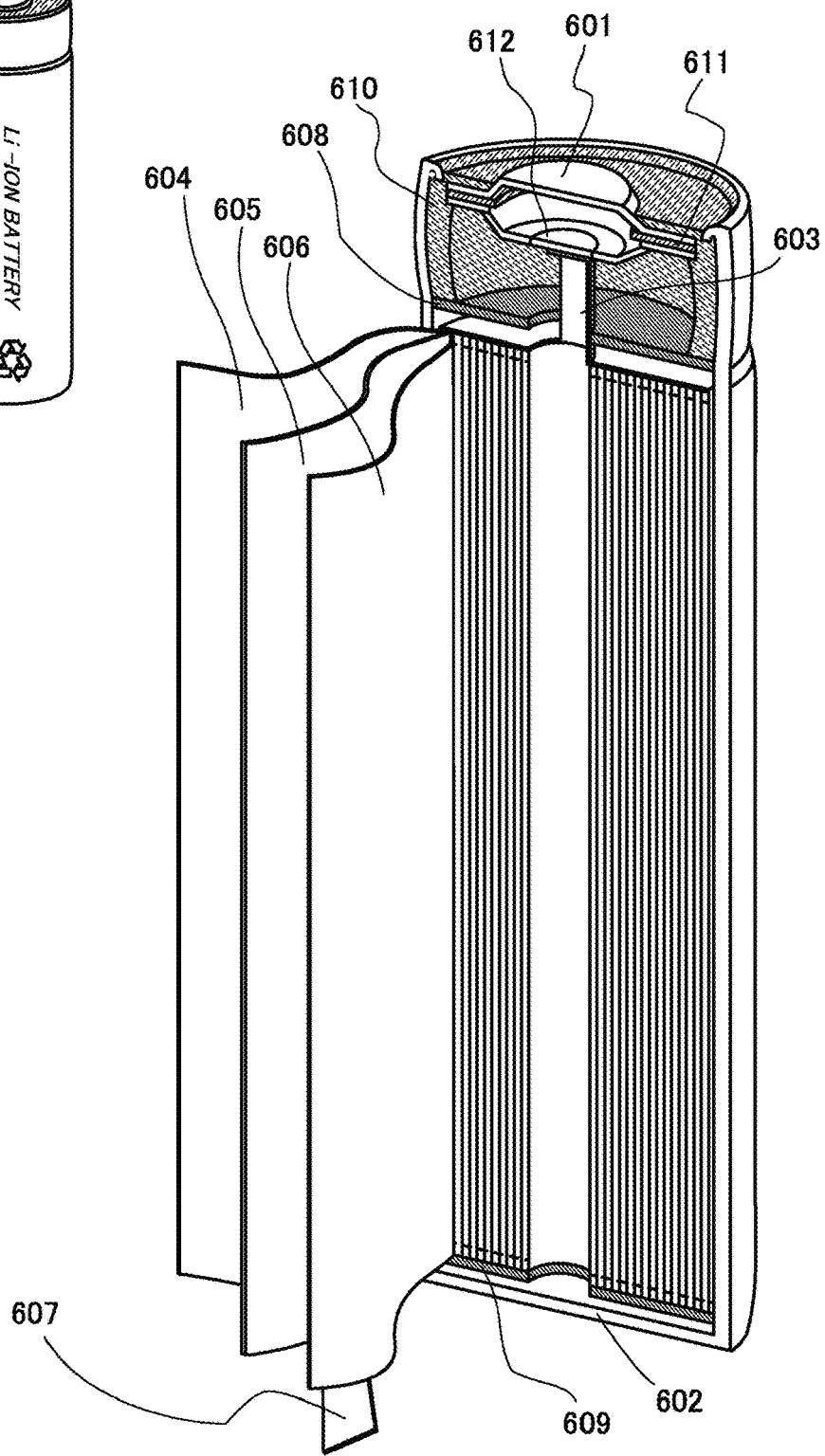

FIG. 12B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element. As the nonaqueous electrolytic solution, a nonaqueous electrolytic solution that is similar to those of the coin-type storage battery can be used.

As at least one of the positive electrode 604 and the negative electrode 606, the power storage device electrode of one embodiment of the present invention is used. Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Laminated Storage Battery]

Next, an example of a laminated storage battery will be described with reference to FIG. 13A. When a flexible laminated storage battery is used in an electronic device at least part of which is flexible, the storage battery can be bent as the electronic device is bent.

Figure 13A:
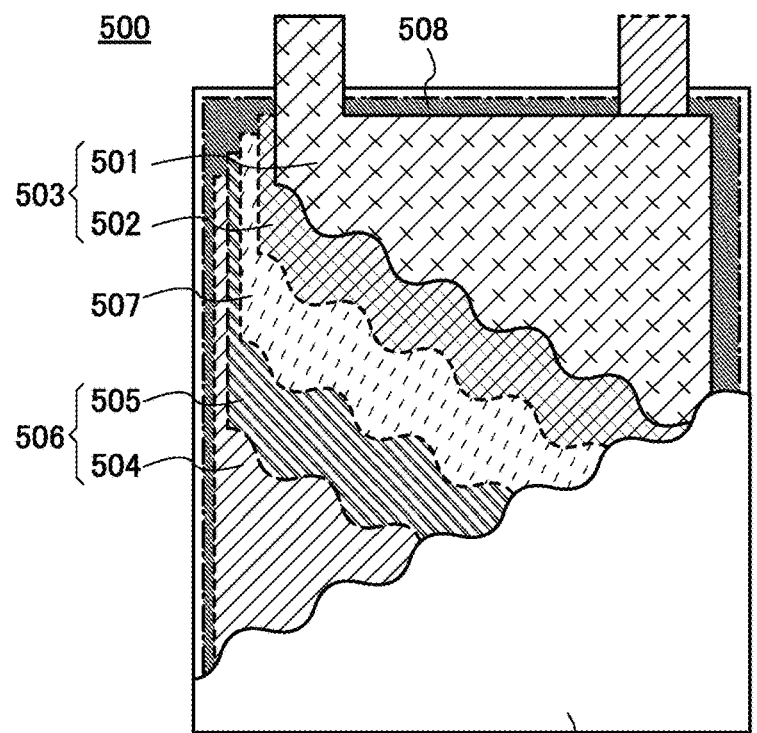
FIGS. 13A and 13B illustrate a laminated storage battery.

A laminated storage battery 500 illustrated in FIG. 13A includes a positive electrode 503 including a positive electrode current collector 501 and a positive electrode layer 502, a negative electrode 506 including a negative electrode current collector 504 and a negative electrode layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. As at least one of the positive electrode 503 and the negative electrode 506, the power storage device electrode of one embodiment of the present invention is used. That is, the positive electrode layer 502 preferably includes the second electrode layer containing the active material and the first electrode layer for increasing adhesion, and the active material preferably has a coating film formed using perhydropolysilazane. It is preferable that the power storage device electrode described in Embodiment 1 be used for the negative electrode 506. That is, the negative electrode layer 505 preferably includes the second electrode layer containing the active material and the first electrode layer for increasing adhesion, and the active material preferably has a coating film formed using perhydropolysilazane.

In the laminated storage battery 500 illustrated in FIG. 13A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Figure 13B:
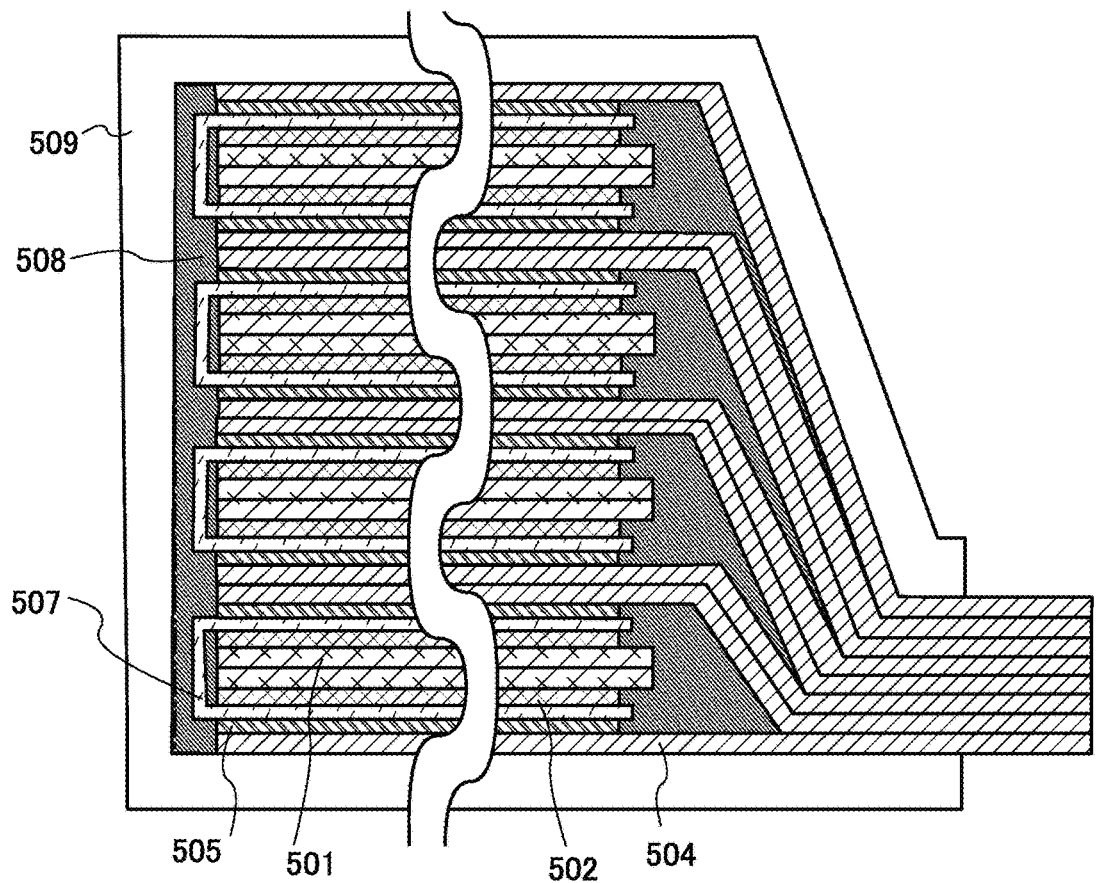

FIG. 13B illustrates an example of a cross-sectional structure of the laminated storage battery 500. FIG. 13A illustrates an example of including only the electrode layers provided to two current collectors for simplicity, and the battery preferably includes electrode layers provided to three or more current collectors.

The example in FIG. 13B includes 16 electrode layers. The laminated storage battery 500 has flexibility even though including 16 electrode layers. In FIG. 13B, 8 negative electrode current collectors 504 and 8 positive electrode current collectors 501 are included. Note that FIG. 13B illustrates a cross section of the lead portion of the negative electrode, and 8 negative electrode current collectors 504 are bonded to each other by ultrasonic welding. It is needless to say that the number of electrode layers is not limited to 16, and may be more than 16 or less than 16. In the case of using a large number of electrode layers, the storage battery can have high capacity. In contrast, in the case of using a small number of electrode layers, the storage battery can have a small thickness and high flexibility.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

FIGS. 14A to 14E illustrate examples of electronic devices including flexible laminated storage batteries. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 14A:
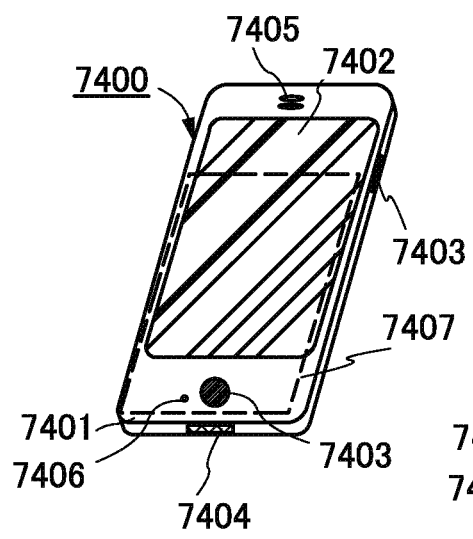
FIGS. 14A to 14E illustrate flexible laminated storage batteries.

FIG. 14A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 14B:
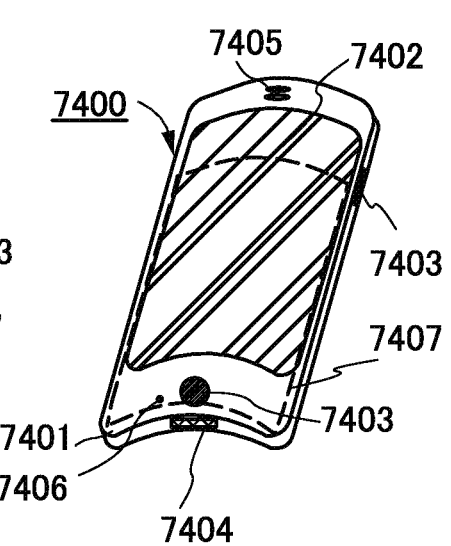
Figure 14C:
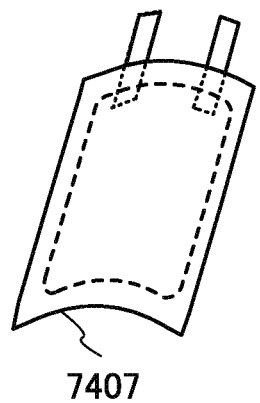

FIG. 14B illustrates the mobile phone 7400 that is bent. When the whole mobile phone 7400 is bent by the external force, the power storage device 7407 included in the mobile phone 7400 is also bent. FIG. 14C illustrates the bent power storage device 7407. The power storage device 7407 is a laminated storage battery.

Figure 14D:
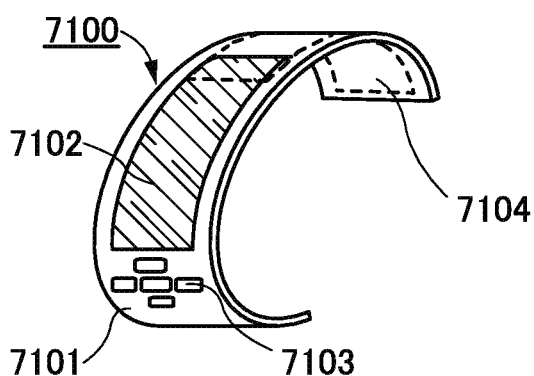
Figure 14E:
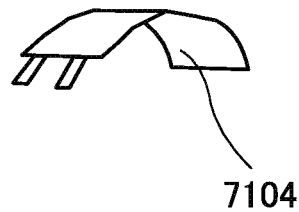

FIG. 14D illustrates an example of a bangle display device. A portable display device 7100 includes a housing 7101, a display portion 7102, an operation button 7103, and a power storage device 7104. FIG. 14E illustrates the bent power storage device 7104.

[Structural Example of Power Storage Device]

Structural examples of power storage devices (storage batteries) will be described with reference to FIGS. 15A and 15B, FIGS. 16A1, 16A2, 16B1, and 16B2, FIGS. 17A and 17B, FIGS. 18A and 18B, and FIG. 19.

Figure 15A:
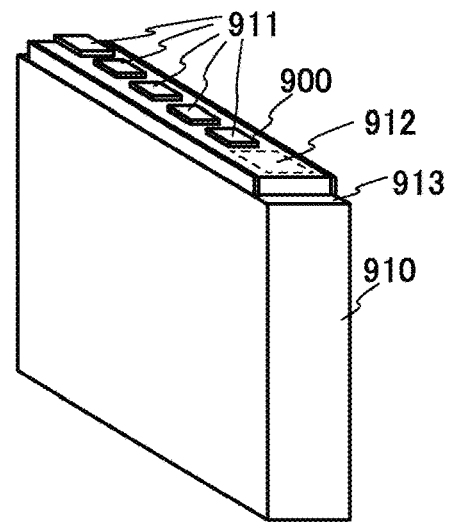
FIGS. 15A and 15B illustrate an example of a power storage device.
Figure 15B:
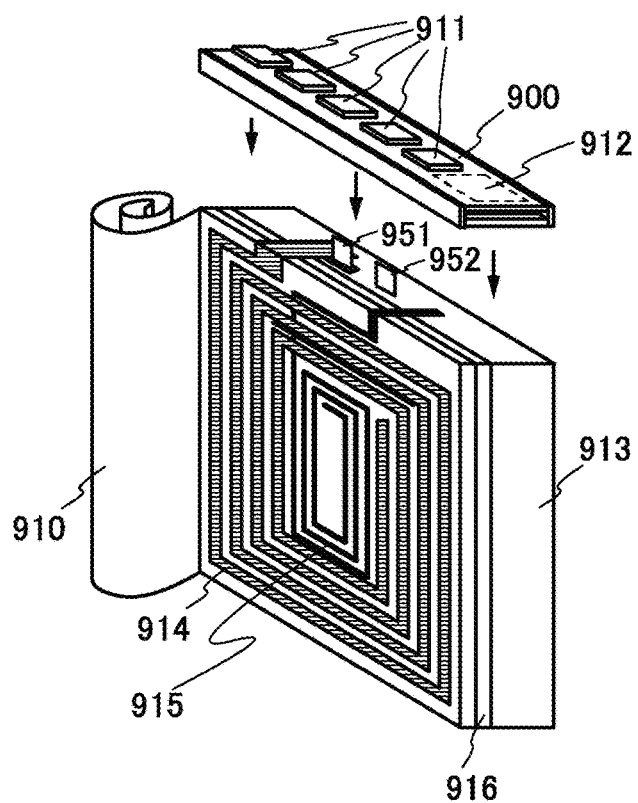

FIGS. 15A and 15B are external views of a power storage device. The power storage device includes a circuit board 900 and a power storage unit 913. A label 910 is attached to the power storage unit 913. As shown in FIG. 15B, the power storage device further includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 has a function of blocking an electromagnetic field from the power storage unit 913, for example. As the layer 916, for example, a magnetic body can be used.

Note that the structure of the power storage device is not limited to that shown in FIGS. 15A and 15B.

For example, as shown in FIGS. 16A1 and 16A2, two opposing surfaces of the power storage unit 913 in FIGS. 15A and 15B may be provided with respective antennas. FIG. 16A1 is an external view showing one side of the opposing surfaces, and FIG. 16A2 is an external view showing the other side of the opposing surfaces. For portions similar to those in FIGS. 15A and 15B, a description of the power storage device illustrated in FIGS. 15A and 15B can be referred to as appropriate.

As illustrated in FIG. 16A1, the antenna 914 is provided on one of the opposing surfaces of the power storage unit 913 with the layer 916 interposed therebetween, and as illustrated in FIG. 16A2, the antenna 915 is provided on the other of the opposing surfaces of the power storage unit 913 with a layer 917 interposed therebetween. The layer 917 has a function of blocking an electromagnetic field from the power storage unit 913. As the layer 917, for example, a magnetic body can be used.

With the above structure, both of the antennas 914 and 915 can be increased in size.

Alternatively, as illustrated in FIGS. 16B1 and 16B2, two opposing surfaces of the power storage unit 913 in FIGS. 15A and 15B may be provided with different types of antennas. FIG. 16B1 is an external view showing one side of the opposing surfaces, and FIG. 16B2 is an external view showing the other side of the opposing surfaces. For portions similar to those in FIGS. 15A and 15B, a description of the power storage device illustrated in FIGS. 15A and 15B can be referred to as appropriate.

As illustrated in FIG. 16B1, the antennas 914 and 915 are provided on one of the opposing surfaces of the power storage unit 913 with the layer 916 interposed therebetween, and as illustrated in FIG. 16B2, an antenna 918 is provided on the other of the opposing surfaces of the power storage unit 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 17A:
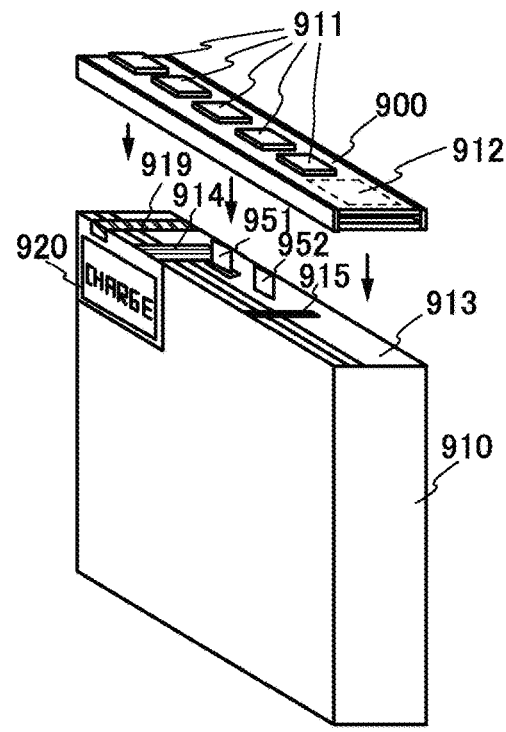
FIGS. 17A and 17B illustrate examples of power storage devices.

Alternatively, as illustrated in FIG. 17A, the power storage unit 913 in FIGS. 15A, 15B, 16A1, 16A2, 16B1, and 16B2 may be provided with a display device 920. The display device 920 is electrically connected to the terminal 911 via a terminal 919. It is possible that the label 910 is not provided in a portion where the display device 920 is provided. For portions similar to those in FIGS. 15A, 15B, 16A1, 16A2, 16B1, and 16B2, a description of the power storage device illustrated in FIGS. 15A, 15B, 16A1, 16A2, 16B1, and 16B2 can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 17B:
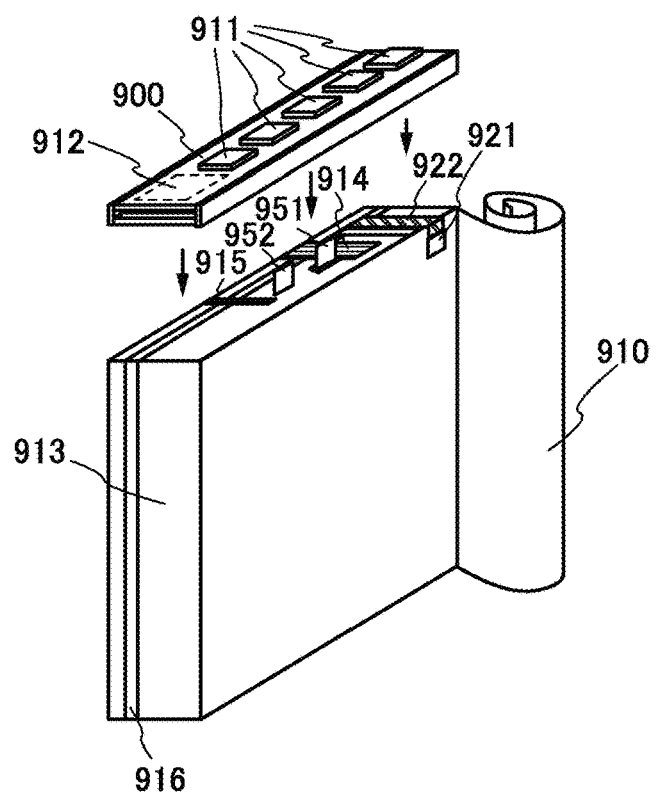

Alternatively, as illustrated in FIG. 17B, the power storage unit 913 illustrated in FIGS. 15A, 15B, 16A1, 16A2, 16B1, and 16B2 may be provided with a sensor 921. The sensor 921 is electrically connected to the terminal 911 via a terminal 922. Note that the sensor 921 may be provided between the power storage unit 913 and the label 910. For portions similar to those in FIGS. 15A, 15B, 16A1, 16A2, 16B1, and 16B2, a description of the power storage device illustrated in FIGS. 15A, 15B, 16A1, 16A2, 16B1, and 16B2 can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be determined and stored in a memory inside the circuit 912.

Furthermore, structural examples of the power storage unit 913 will be described with reference to FIGS. 18A and 18B and FIG. 19.

Figure 18A:
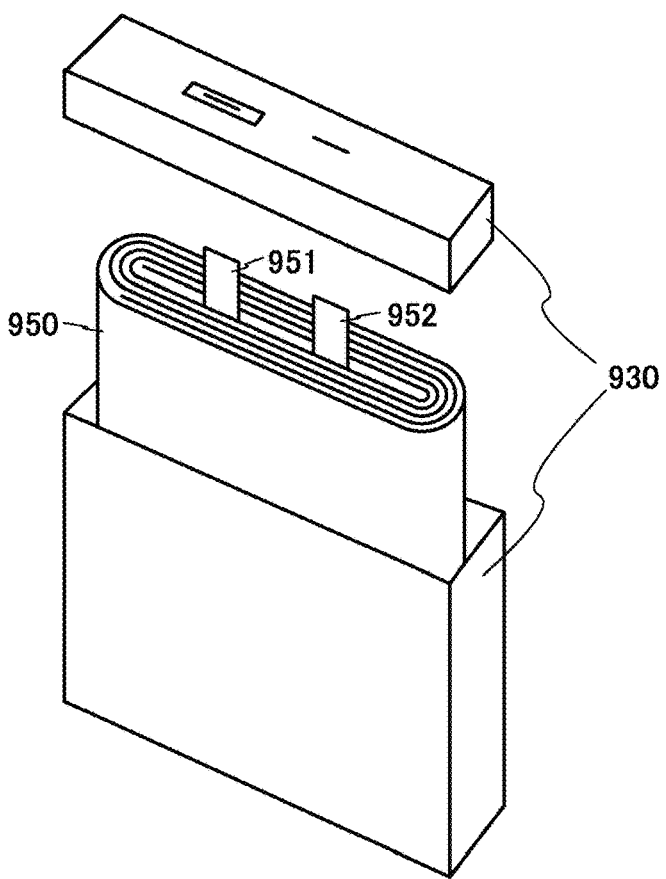
FIGS. 18A and 18B illustrate examples of power storage devices.

The power storage unit 913 illustrated in FIG. 18A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 18A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 18B:
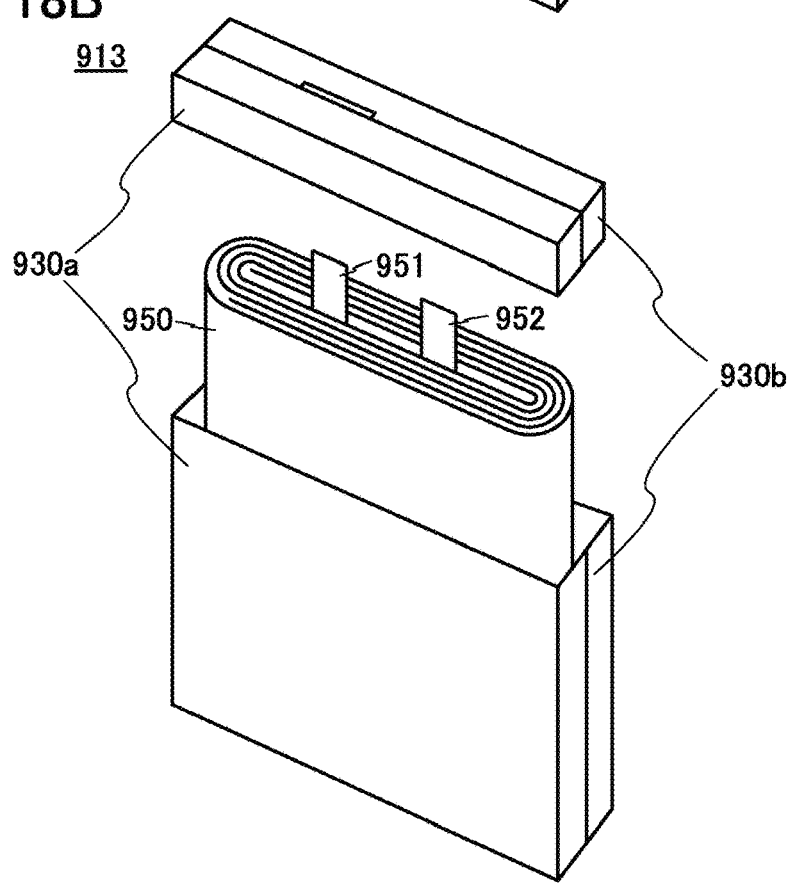

Note that as illustrated in FIG. 18B, the housing 930 in FIG. 18A may be formed using a plurality of materials. For example, in the power storage unit 913 in FIG. 18B, a housing 930a and a housing 930b are bonded to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the power storage unit 913 can be prevented. When an electric field is not significantly blocked by the housing 930a, an antenna such as the antennas 914 and 915 may be provided inside the housing 930a. For the housing 930b, a metal material can be used, for example.

Figure 19:
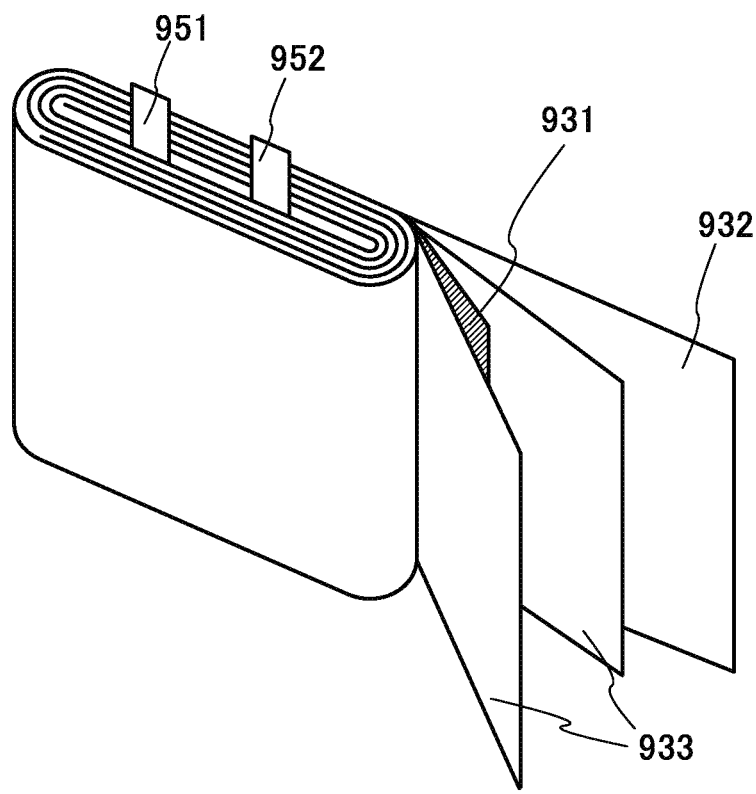
FIG. 19 illustrates an example of a power storage device.

FIG. 19 illustrates the structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 15A, 15B, 16A1, 16A2, 16B1, and 16B2 via one of the terminals 951 and 952. The positive electrode 932 is connected to the terminal 911 in FIGS. 15A, 15B, 16A1, 16A2, 16B1, and 16B2 via the other of the terminals 951 and 952.

[Examples of Electronic Devices: Vehicles]

Next, examples where a storage battery is used in a vehicle will be described. The use of storage batteries in vehicles enables production of next-generation clean energy vehicles such as hybrid electric vehicles (HEVs), electric vehicles (EVs), and plug-in hybrid electric vehicles (PHEVs).

Figure 20A:
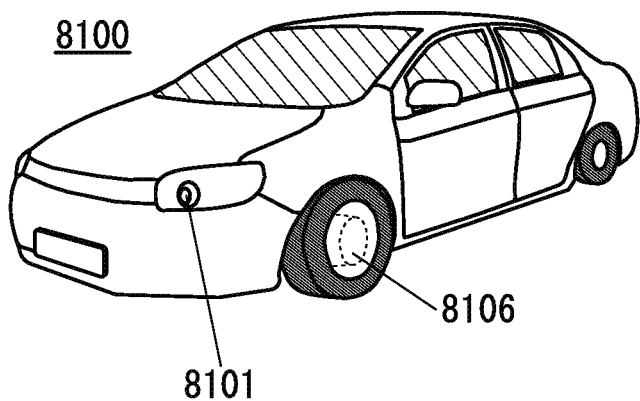
FIGS. 20A and 20B illustrate application examples of a power storage device.
Figure 20B:
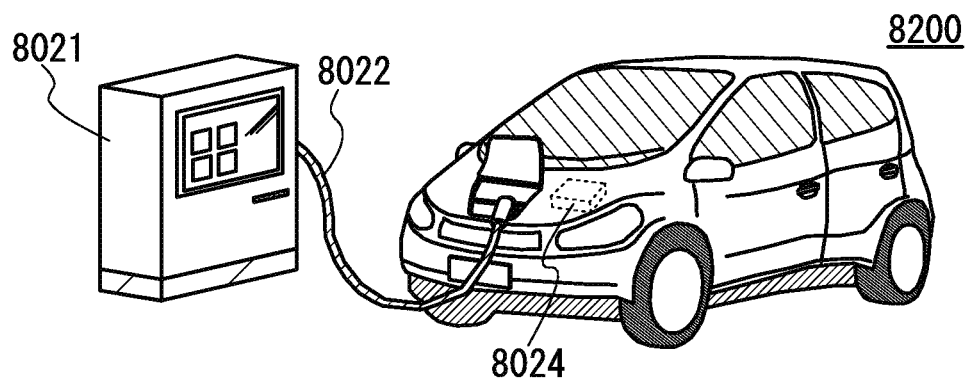

FIGS. 20A and 20B each illustrate an example of a vehicle using one embodiment of the present invention. An automobile 8100 illustrated in FIG. 20A is an electric vehicle that runs on the power of an electric motor. Alternatively, the automobile 8100 is a hybrid electric vehicle capable of driving appropriately using either the electric motor or the engine. One embodiment of the present invention can provide a vehicle for longer distances. The automobile 8100 includes a power storage device using the storage battery. The power storage device is used not only for driving an electric motor 8106, but also for supplying electric power to a light-emitting device such as a headlight 8101 or a room light (not illustrated).

The power storage device can also supply electric power to an instrument panel included in the automobile 8100, such as a speedometer or a tachometer. Furthermore, the power storage device can supply electric power to a semiconductor device included in the automobile 8100, such as a navigation system.

FIG. 20B illustrates an automobile 8200 including the power storage device. The automobile 8200 can be charged when the power storage device is supplied with electric power through external charging equipment by a plug-in system, a contactless power feeding system, or the like. In FIG. 20B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, a power storage device 8024 included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in combination with any of the other embodiments as appropriate.

Example 1

In this example, the electrode described in Embodiment 1 was manufactured and the electrode strength was evaluated. A half cell and a full cell were manufactured using the electrode and their characteristics were evaluated.

(Formation of Electrode)

As described in Embodiment 1, slurry was prepared to form an electrode.

Slurry A was prepared in the following manner: acetylene black (the surface area was 63 $m^2/g$, and the grain diameter was approximately 30 nm) was added to N-methyl-2-pyrrolidone (NMP) including 12 wt % polyvinylidene fluoride (PVdF), and the mixture was stirred and mixed in a mixer at 2000 rpm for 25 minutes. The PVdF was one to which a carboxyl group was added.

Slurry B was prepared by mixing an aqueous solution of polyarylamine (product name: PAA-15C) and an anchor coat agent (product name: Super Collophite). Polyarylamine is a compound having an amino group. The anchor coat agent contains graphite and water in a weight ratio of 89.5:10.5 (wt %). The anchor coat agent contains ammonia as a dispersant. The aqueous solution of polyarylamine (PAA-15C) including 15 wt % polyarylamine was mixed into the anchor coat agent. The weight ratio of the anchor coat agent to the aqueous solution of polyarylamine was 0.35:99.65 (wt %). The obtained mixture was stirred and mixed by a stirrer at 300 rpm for 120 minutes.

Slurry C was prepared by mixing polyethylene oxide (product name: (primary) polyethylene glycol 2000) and an anchor coat agent. The anchor coat agent was the same as that used for the slurry B. The weight ratio of the anchor coat agent to polyethylene oxide was 1.2:98.8 (wt %). The obtained mixture was stirred and mixed by a stirrer at 300 rpm for 120 minutes.

The slurry A, the slurry B, and the slurry C formed in such manners were each applied to a copper current collector at a rate of 10 mm/sec with a blade coating apparatus. Then, drying at 30° C. was performed for 5 minutes, and drying at 50° C. was performed for 15 minutes. A hot plate was used for the drying. This step was performed outside a dry room.

The slurry A, the slurry B, and the slurry C were each applied to the current collector as described above to form an electrode layer A-1, an electrode layer B-1, and an electrode layer C-1, whereby an electrode A, an electrode B, and an electrode C were obtained.

Slurry D was foil led in the following manner. Graphite particles with an average primary grain diameter of 10 μm were added to N-methyl-2-pyrrolidone (NMP) including 12 wt % polyvinylidene fluoride (PVdF). The mixture was stirred and mixed in a mixer at 2000 rpm for 10 minutes 3 times. The PVdF was one to which a carboxyl group was added. The amount of the graphite was 4 g, and the amount of the NMP solution including 12 wt % PVdF was 3.7 g. Then, a perhydropolysilazane solution was dropped to the mixture. The mixture was stirred and mixed in the mixer at 2000 rpm for 3 minutes once. In the slurry, exclusive of the NMP, the graphite, the PVdF, and silicon oxide were mixed in a weight ratio of 88:9.8:2.2 [wt %]. Here, the weight of silicon oxide is a generation amount estimated on the assumption that the whole perhydropolysilazane that is a precursor is reacted. This slurry was formed in a dry room to prevent entry of moisture.

The thus formed slurry D was applied to the electrode A including the electrode layer A-1, the electrode B including the electrode layer B-1, the electrode C including the electrode layer C-1, and the copper current collector without any electrode layer by using a blade coating apparatus at a rate of 10 mm/sec. The sample in which the slurry D was applied to the copper current collector without any electrode layer is referred to as an electrode D. Next, the electrodes were dried by ventilation drying at 70° C. for 20 minutes to volatilize a polar solvent.

Then, to form a coating film on the active material, heating using a hot plate was performed at high humidity at 70° C. for 1 hour in a draft chamber. The humidity was increased by hating water in the atmosphere. After that, baking was performed using a hot plate in the air at 150° C. for 1 hour. Through the step, the electrodes were baked and hydrolysis of the perhydropolysilazane proceeded to form silicon oxide. Here, also the carboxyl group of the PVdF reacted with the perhydropolysilazane to generate ammonia ($NH_3$) and hydrogen ($H_2$). Note that the reaction between the perhydropolysilazane and the carboxyl group of the PVdF probably started in the step for forming the slurry in which the PVdF and the perhydropolysilazane were mixed at room temperature. Through the step for forming the slurry at room temperature and the step for baking the slurry at 70° C. and 150° C., the coating film covering the surface of the active material became spongy silicon oxide having a plurality of pores. Moreover, the silicon oxide contains silicon (Si) and oxygen (O) as its main components in addition to carbon (C) and fluorine (F) by the reaction with the PVdF. In this manner, active material layers (electrode layers) D were formed using the slurry D.

Next, heating was performed at 170° C. in a reduced pressure atmosphere for 12 hours to dry the electrodes. The electrodes were pressed and compressed. Then, the electrodes were stamped out to form the electrode A, the electrode B, and the electrode C that are negative electrodes for power storage devices. The electrode A includes the electrode layer A-1 and the active material layer D; the electrode B, the electrode layer B-1 and the active material layer D; the electrode C, the electrode layer C-1 and the active material layer D; and the electrode D, the active material layer D. In each of the electrodes A, B, C, and D, the proportion of the coating film to the total active material in the active material layer D is 2.5 wt %.

Next, a comparative electrode E was formed. Graphite particles with an average primary grain diameter of 10 μM were added to NMP including 8 wt % PVdF, and the mixture was stirred and mixed in a mixer, so that slurry E was obtained. The slurry E includes graphite and PVdF in a weight ratio of 90:10 (wt %). The PVdF was one to which a carboxyl group was added. Then, the slurry E was applied to a copper current collector and dried, whereby the comparative electrode E including an active material layer (electrode layer) was obtained.

(SEM Observation)

Figure 10A:
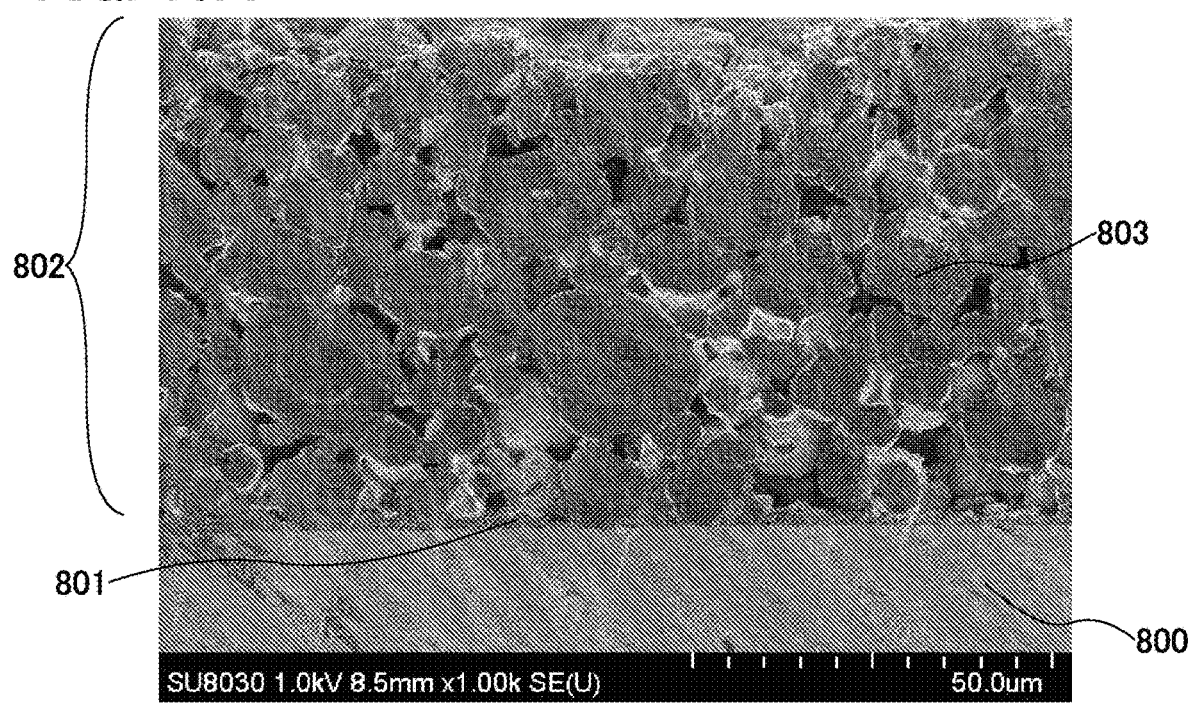
FIGS. 10A and 10B are cross-sectional SEM images of an electrode.
Figure 10B:
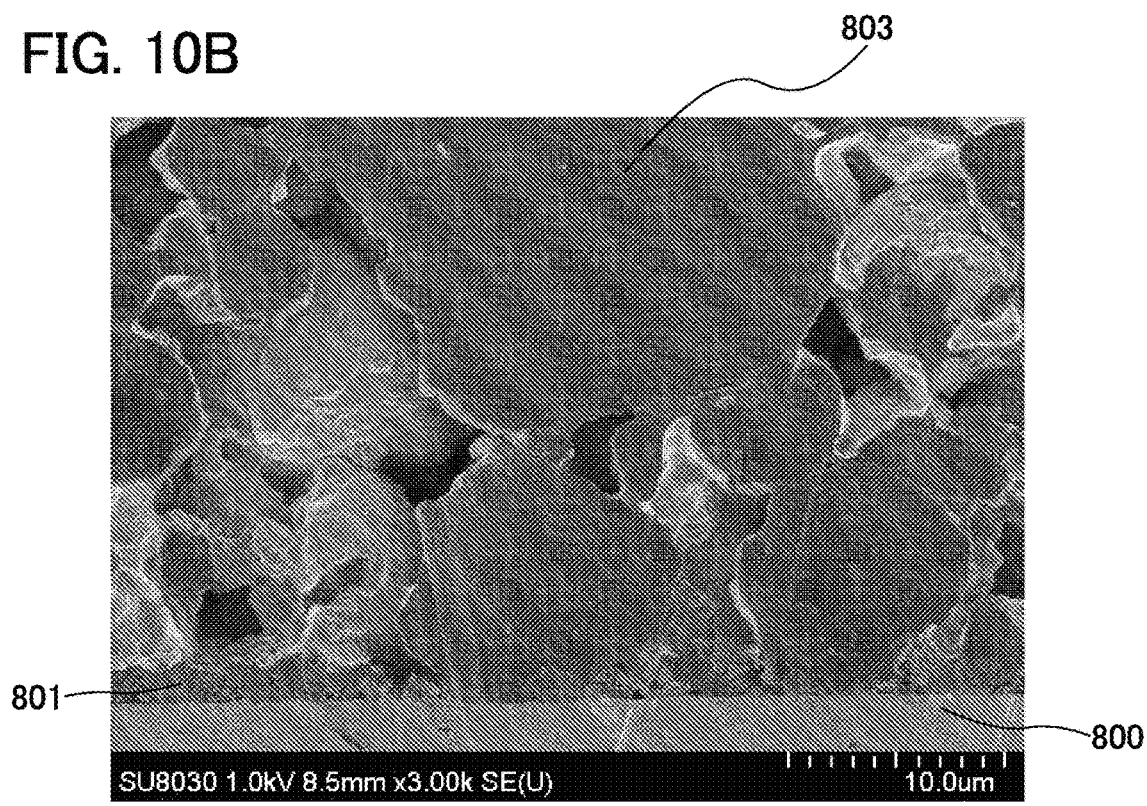

FIGS. 10A and 10B are cross-sectional SEM images of the electrode A. FIG. 10A shows an image at a 1000-fold magnification. FIG. 10B shows an image at a 3000-fold magnification. A current collector 800, a first electrode layer 801, a second electrode layer 802, and the active material 803 of the second electrode layer were observed. It was observed that the first electrode layer 801 was in close contact with the second electrode layer 802 and the current collector 800. The first electrode layer 801 was found to exist on the current collector, in an island shape.

(180° C. Peeling Test)

FIGS. 8A and 8B are schematic views illustrating 180° peeling test. Before the peeling test, an electrode layer 1002 was provided over one surface of a current collector 1001. As illustrated in FIG. 8A, the electrode layer was peeled from the current collector 1001 and bent at an angle of 180°. An end portion 1004 of the peeled electrode layer and an end portion 1005 of the current collector from which the electrode had been peeled were fixed, the end portion 1004 of the peeled electrode layer was pulled and peeled at a speed of 20 mm/s, and at this moment, the force was measured. At this time, the direction in which the electrode layer was pulled formed an angle of approximately 180° with the direction in which the electrode was originally formed. The force was measured using EZ graph (produced by SHIMADZU CORPORATION). FIG. 8B shows an electrode layer similarly pulled and peeled, where a portion of an electrode layer 1003 is left on the current collector.

Figure 5A:
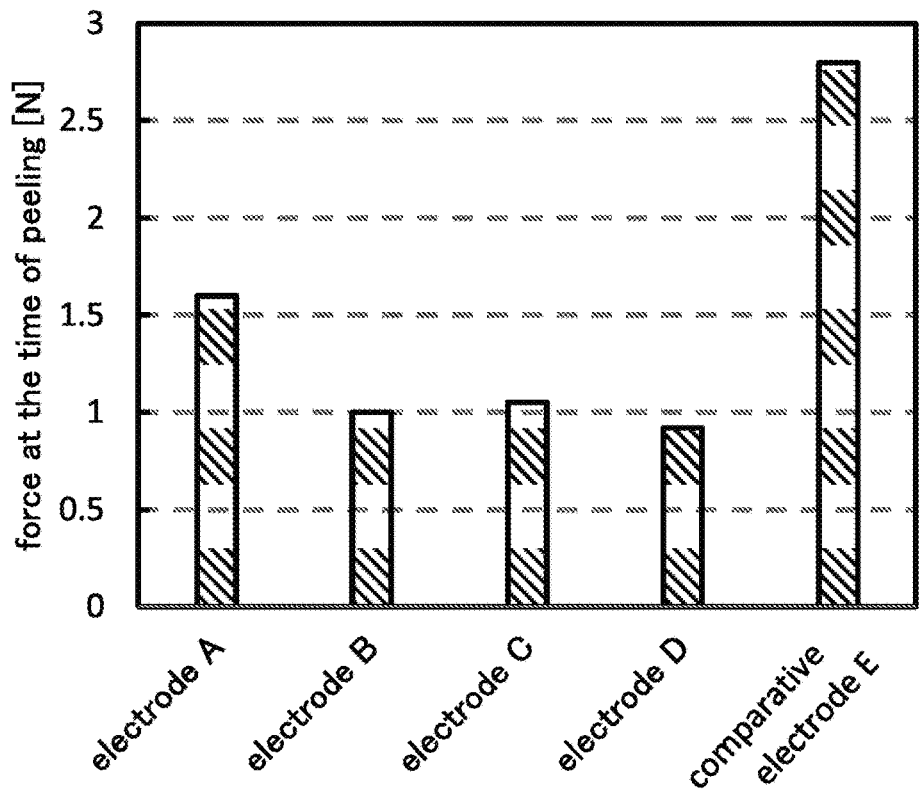
FIGS. 5A and 5B show results of peel strength tests of power storage device electrodes.
Figure 5B:
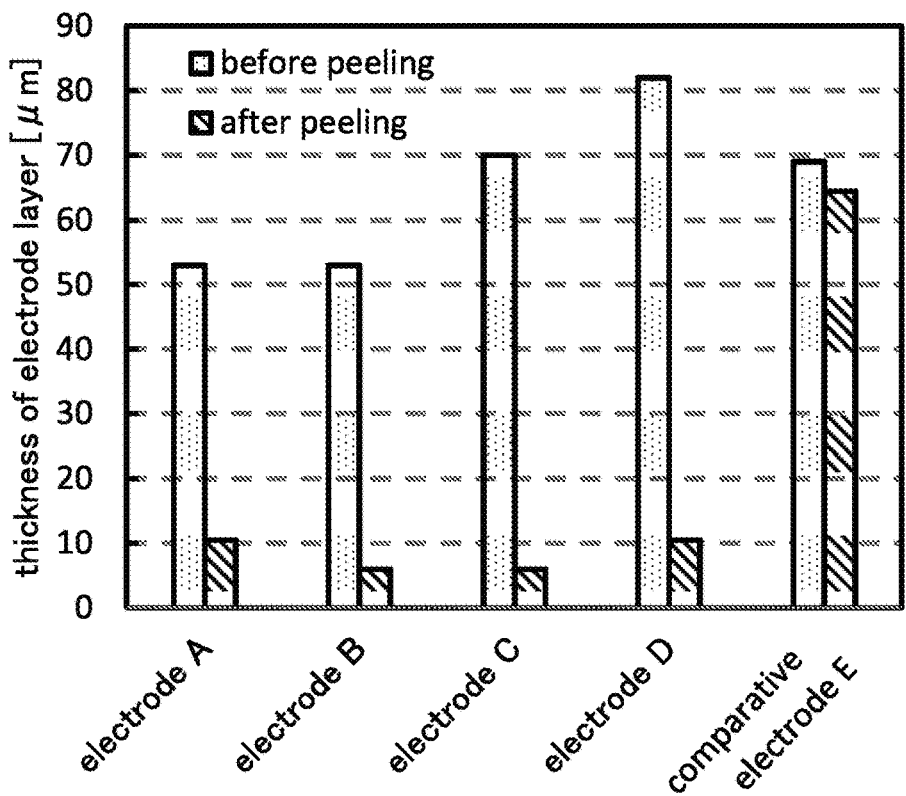

FIGS. 5A and 5B show results of the 180° peeling test. FIG. 5A shows the force at the time of peeling. FIG. 5B shows the thicknesses of the electrode layer on the current collector before and after the peeling. Note that the thickness of the electrode layer does not include the thickness of the current collector. First, the samples that do not include the electrode layer for increasing adhesion are described. In the case of the comparative electrode E formed without using perhydropolysilazane, the peeling force at the time of the peeling test was 2.8 N. In the case of the electrode D using perhydropolysilazane, the peeling force was 0.9 N. These results show that although exhibiting high flexibility in the bending test, the electrode D has low peel strength.

From FIG. 5B, it is found that in each of the electrodes A, B, C, and D, the thickness of the electrode layer left on the current collector after the peeling was much smaller than the thickness before the peeling, and the peeling occurred in the vicinity of the current collector. This suggests that in these electrodes, adhesion inside the active material layers D, e.g., adhesion between the active material particles, is high.

Next, results of the peel strength test of the electrode A including the electrode layer A-1 and the active material layer D, the electrode B including the electrode layer B-1 and the active material layer D, and the electrode C including the electrode layer C-1 and the active material layer D are described. The peeling force of the electrode A was approximately 1.6 N and the electrode A had peel strength higher than that of the electrode D in which such an electrode layer is not provided between the current collector and the active material layer D. The electrode B exhibited a peeling force of 1.0 N, which is larger than that of the electrode D by approximately 0.1 N. The electrode C exhibited a peeling force of 1.1 N, which is larger than that of the electrode D by approximately 0.2 N.

The results shown in FIGS. 4A and 4B suggest that the active material layer D has high flexibility. Providing the electrode layer A-1 made it possible to provide an electrode with a high peel strength and high flexibility. Furthermore, the electrode layer A-1 including PVdF with a carboxyl group as a binder exhibited the highest adhesion. Thus, it was found that a carboxyl group is effective in increasing adhesion. In addition, the peeling force of the electrode B-1 using polyarylamine and that of the electrode C-1 using polyethylene oxide were also increased; therefore, the polarity of an amino group of polyarylamine and that of an oxygen atom of polyethylene oxide probably contribute to adhesion. Note that the peeling force is preferably 0.95 N or higher, further preferably 1.3 N or higher.

(Charge and Discharge Characteristics of Half Cell)

The characteristics of half cells formed using the electrodes A and D will be described. Each of the cells was a CR2032 coin-type storage battery (with a diameter of 20 mm and a height of 3.2 mm). As a counter electrode, a lithium (Li) metal foil was used. An electrolytic solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7. Here, charging and discharging of a half cell using a graphite electrode can be expressed by the formulae below.

Figure 22:
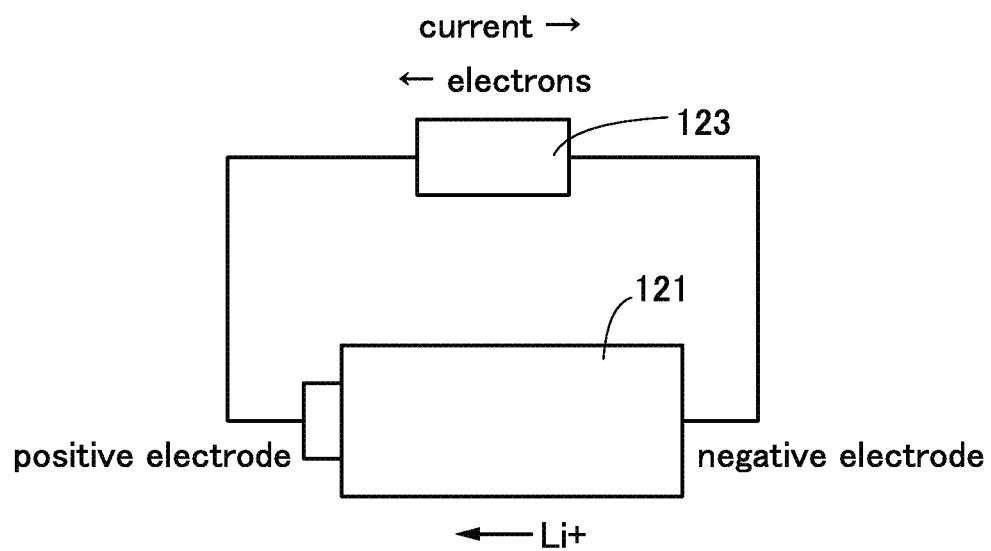
FIG. 22 illustrates operation of a half cell.

FIG. 22 shows a connection structure of a half cell 121 and a load 123 in the case of discharging the half cell including the graphite electrode and the lithium (Li) electrode which is a counter electrode. When the half cell is discharged, a reaction of Formula (2) occurs at the graphite electrode.

$$xC+Li^++e^-\rightarrow C_xLi \quad (2)$$

A reaction of Formula (3) occurs at the lithium (Li) electrode.

$$Li\rightarrow Li^++e^- \quad (3)$$

Figure 21:
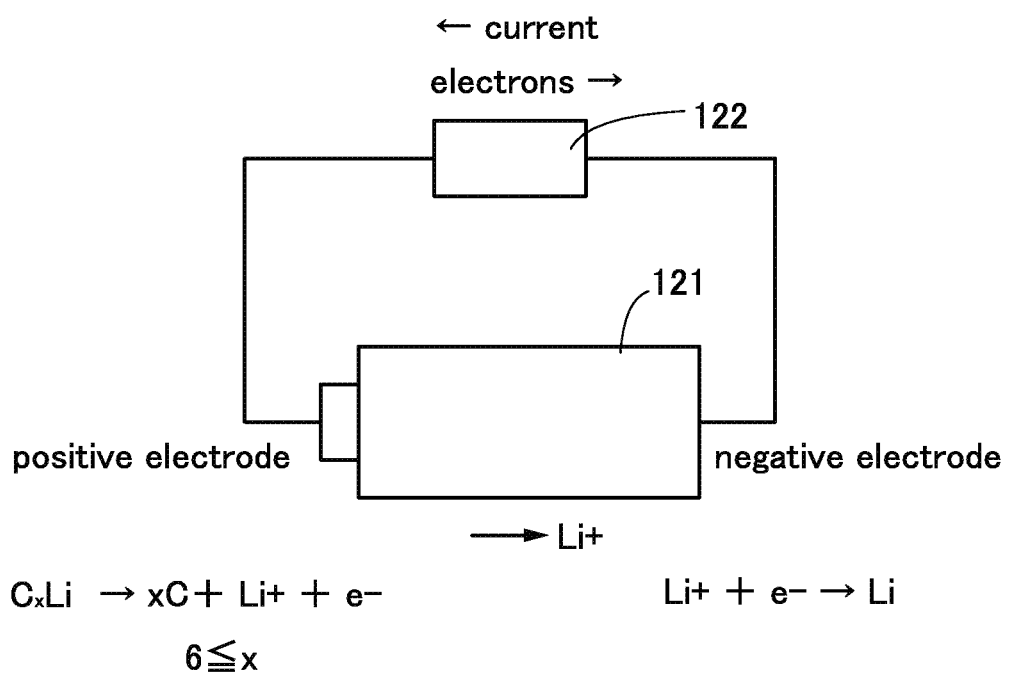
FIG. 21 illustrates operation of a half cell.

FIG. 21 shows a connection structure of the half cell 121 and a charger 122 in the case of charging the half cell including the graphite electrode and the lithium (Li) electrode which is a counter electrode. When the half cell is charged, a reaction of Formula (4) occurs at the graphite electrode.

$$C_xLi\rightarrow xC+Li^++e^- \quad (4)$$

A reaction of Formula (5) occurs at the lithium (Li) electrode.

$$Li^++e^-\rightarrow Li \quad (5)$$

Here, in Formulae (2) to (5), x satisfies the relation, 6≤x. However, depending on the kind of the graphite, x may be smaller than 6.

As indicated by Formulae (1) to (4), lithium (Li) is intercalated into the graphite in discharging and is deintercalated from the graphite in charging. In other words, the evaluation of the half cell starts from the discharging operation.

Figure 6A:
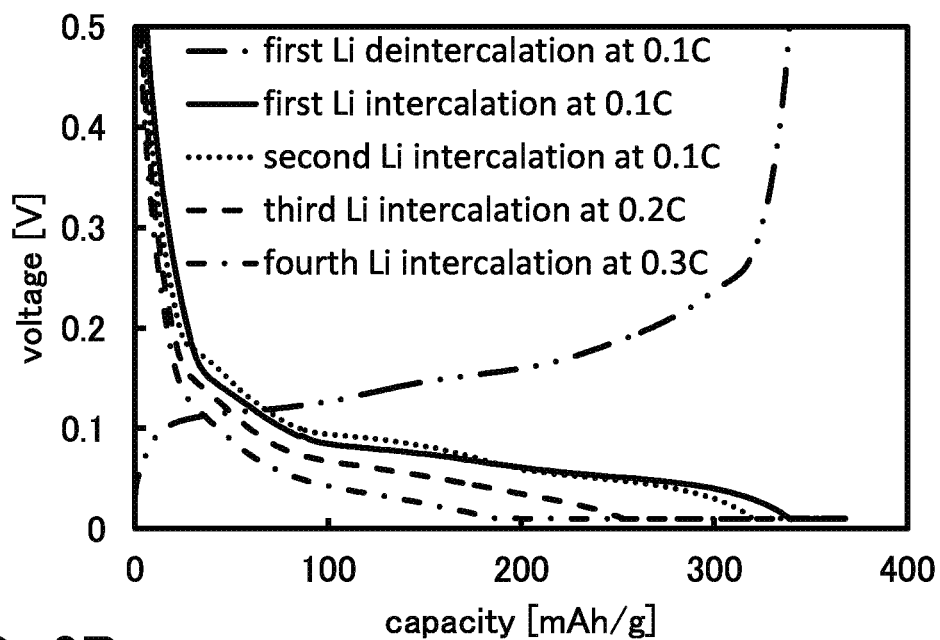
FIGS. 6A and 6B show charge and discharge characteristics of secondary batteries.
Figure 6B:
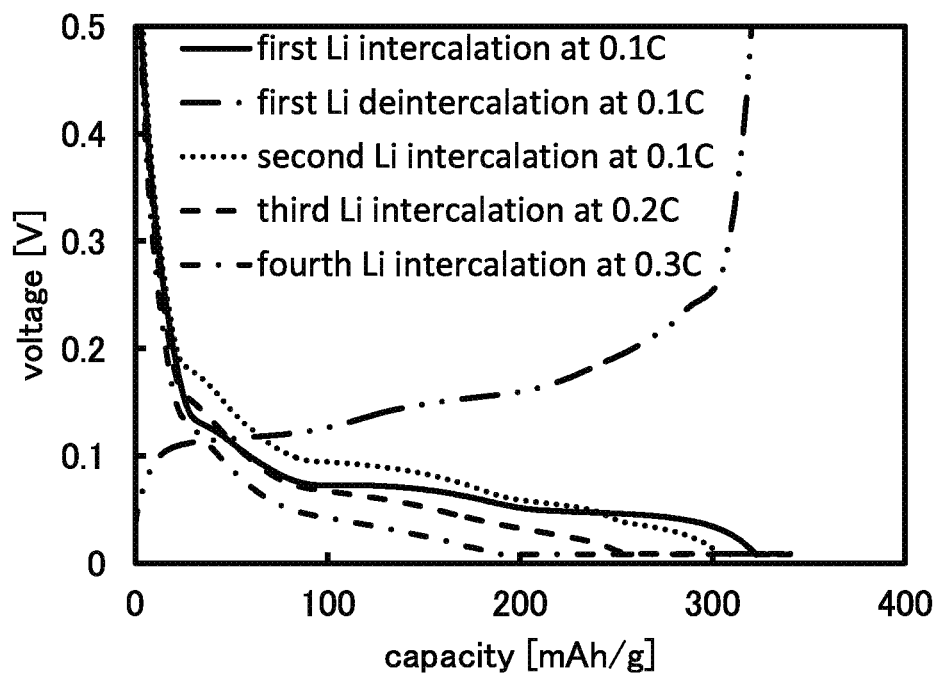

The discharging (lithium (Li) intercalation) of the half cells was performed in the following manner: constant current discharging was performed to a lower limit of 0.01 V, and then, constant voltage discharging was performed at a voltage of 0.01 V to a lower limit of a current value corresponding to 0.01 C. The first and second constant current discharging was performed at a rate of 0.1 C, the third constant current discharging was performed at a rate of 0.2 C, and the fourth constant current discharging was performed at a rate of 0.3 C. As the charging (lithium (Li) deintercalation), constant current charging was performed to an upper limit of 1 V. The first to fourth constant current charging was performed at a rate of 0.1 C. The results are shown in FIGS. 6A and 6B. FIG. 6A shows the characteristics of the cell including the electrode A, and FIG. 6B shows the characteristics of the cell including the electrode D. Deterioration of the characteristics due to the electrode layer A-1 was not observed, and favorable characteristics were obtained.

(Charge and Discharge Characteristics of Full Cell)

Next, full cells were formed using the electrode A. Each of the cells was a CR2032 coin-type storage battery (with a diameter of 20 mm and a height of 3.2 mm). For a positive electrode, an electrode including LiFePO$_4$ as an active material was used. An electrolytic solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7. Charging and discharging were performed at a constant current and a 0.2 C rate. The upper limit voltage was 4.0 V, and the lower limit voltage was 2 V. The measurement temperature was 25° C. Note that the rate was calculated using the theoretical capacity of LiFePO$_4$ of 170 mAh/g as a reference.

Figure 7:
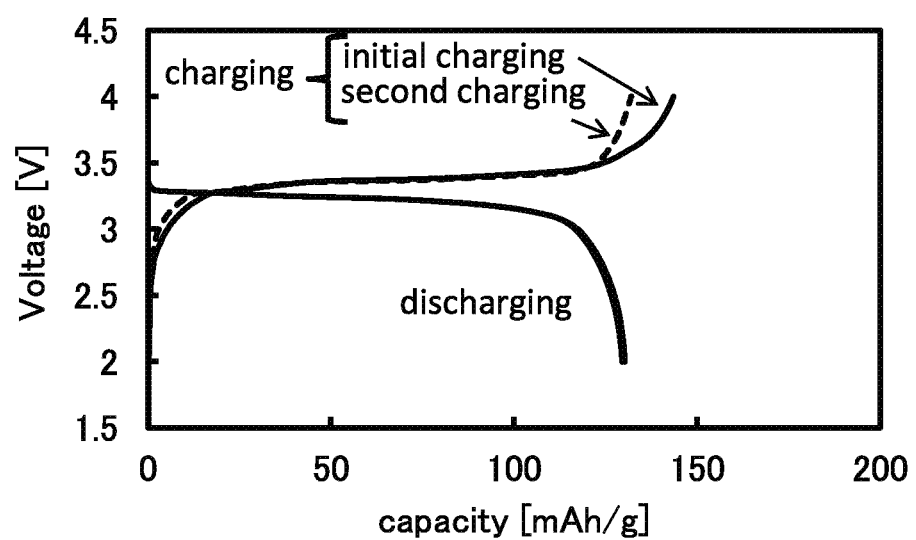
FIG. 7 shows charge and discharge characteristics of a secondary battery.

FIG. 7 shows the results of the charging and discharging. The solid line indicates the initial charging and discharging and the dotted line indicates the second charging and discharging. The initial and second discharge curves substantially overlap with each other. From FIG. 7, it was found that the full cell including the electrode layer A-1 has favorable charge and discharge characteristics. In the above manner, a battery in which an electrode has a high strength and which has favorable characteristics was obtained.

This application is based on Japanese Patent Application serial no. 2013-219537 filed with Japan Patent Office on Oct. 22, 2013, the entire contents of which are hereby incorporated by reference.

What is claimed is:

1. A method for manufacturing an electrode, comprising the steps of:
    providing a first mixture comprising a first solvent, a first binder and a conductive particle over a current collector to form a first layer comprising the first binder and the conductive particle;
    forming a second mixture comprising a second solvent, a second binder and an active material particle;
    adding perhydropolysilazane to the second mixture in order to form a third mixture;
    providing the third mixture over the first layer;
    volatilizing the second solvent in the third mixture under an atmosphere with lower humidity than air to form an active material layer;
    exposing the active material layer to moisture; and
    baking the active material layer to form a coating film covering at least part of a surface of the active material particle in the active material layer after exposing the active material layer to moisture,
    wherein each of the first binder and the second binder comprises a functional group that is a least one of a carboxyl group, a carbonyl group and a hydroxy group, and
    wherein any one of the steps of forming the third mixture and baking the third mixture includes gas generation by a reaction between the functional group in the second binder and the perhydropolysilazane.

2. The method according to claim 1, wherein the perhydropolysilazane is hydrolyzed by the baking.

3. The method according to claim 1, wherein the conductive particle comprises carbon.

4. The method according to claim 1, wherein each of the first binder and the second binder comprises a carboxyl group.

5. The method according to claim 1, wherein the coating film includes pores.

6. The method according to claim 1, wherein the coating film comprises silicon oxide comprising carbon and fluorine.

7. The method according to claim 1, wherein the first binder comprises a carboxyl group.

8. The method according to claim 1, wherein the steps of forming the third mixture includes gas generation by the reaction between the functional group and the perhydropolysilazane.

9. The method according to claim 7,
wherein a spectrum of the first binder in Fourier-transform infrared spectroscopy includes a peak assigned to a carboxyl group, and
wherein the peak assigned to a carboxyl group after baking the second mixture has a weaker intensity than the peak assigned to a carboxyl group before adding the perhydropolysilazane.

10. The method according to claim 1, wherein the coating film is a spongy film.

11. A method for manufacturing an electrode, comprising the steps of:
providing a first mixture comprising a first solvent, a first binder and a conductive particle over a current collector to form a first layer comprising the first binder and the conductive particle;
forming a second mixture comprising a second solvent, a second binder and an active material particle;
adding perhydropolysilazane to the second mixture to form a third mixture;
providing the third mixture over the first layer;
volatilizing the second solvent in the third mixture under an atmosphere with lower humidity than air to form an active material layer;
exposing the active material layer to moisture; and
baking the active material layer under an atmosphere comprising moisture to produce silicon oxide from the perhydropolysilazane after exposing the active material layer to moisture,
wherein each of the first binder and the second binder comprises a carboxyl group, and
wherein any one of the steps of forming the third mixture and baking the third mixture includes gas generation by a reaction between the carboxyl group in the second binder and the perhydropolysilazane.

12. The method according to claim 11, wherein the first binder and the second binder are a same kind of polymer.

13. The method according to claim 11, wherein the perhydropolysilazane is hydrolyzed by the baking.

14. The method according to claim 11, wherein the steps of forming the third mixture includes gas generation by the reaction between the carboxyl group and the perhydropolysilazane.

15. The method according to claim 11,
wherein a spectrum of the first binder in Fourier-transform infrared spectroscopy includes a peak assigned to a carboxyl group, and
wherein the peak assigned to a carboxyl group after baking the second mixture has a weaker intensity than the peak assigned to a carboxyl group before adding the perhydropolysilazane.

16. The method according to claim 11, wherein baking the active material layer is performed at a temperature higher than or equal to 100° C. and lower than or equal to 180° C. after exposing in an atmosphere with higher humidity than air.

17. The method according to claim 11, wherein the step of forming the second mixture produces ammonium gas.

18. The method according to claim 11, wherein the second mixture further comprises a conductive additive.

* * * * *